Feb. 21, 1956 V. G. KLEIN ET AL 2,735,683
RECORD PLAYER
Filed June 15, 1949 15 Sheets-Sheet 1

FIG. I.

Victor G. Klein,
Rudy F. Schneller,
Carl H. Mueller,
Inventors,
Haynes and Koenig,
Attorneys.

Feb. 21, 1956 V. G. KLEIN ET AL 2,735,683
RECORD PLAYER
Filed June 15, 1949 15 Sheets-Sheet 2

Victor G. Klein,
Rudy F. Schneller,
Carl H. Mueller,
Inventors,
Haynes and Koenig
Attorneys.

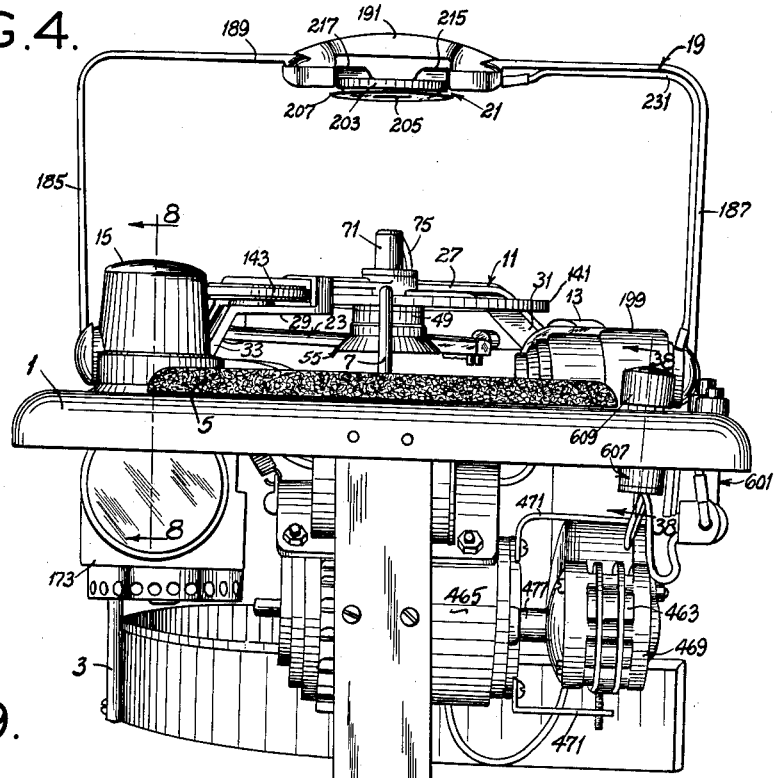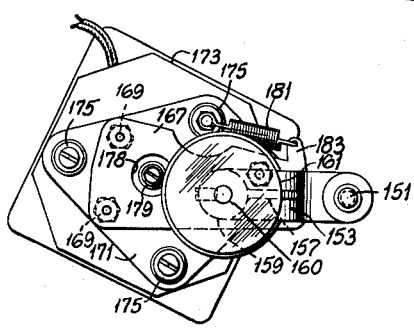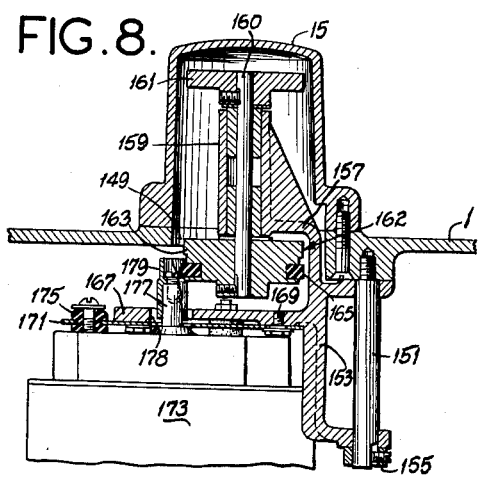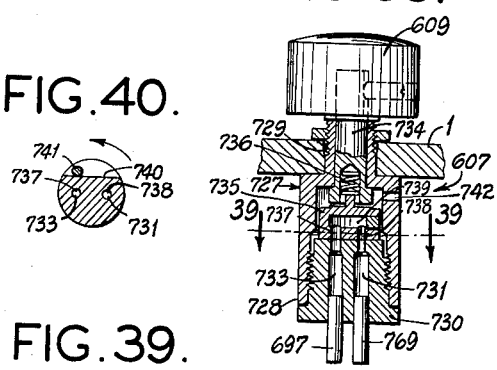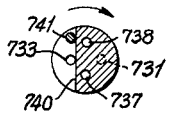

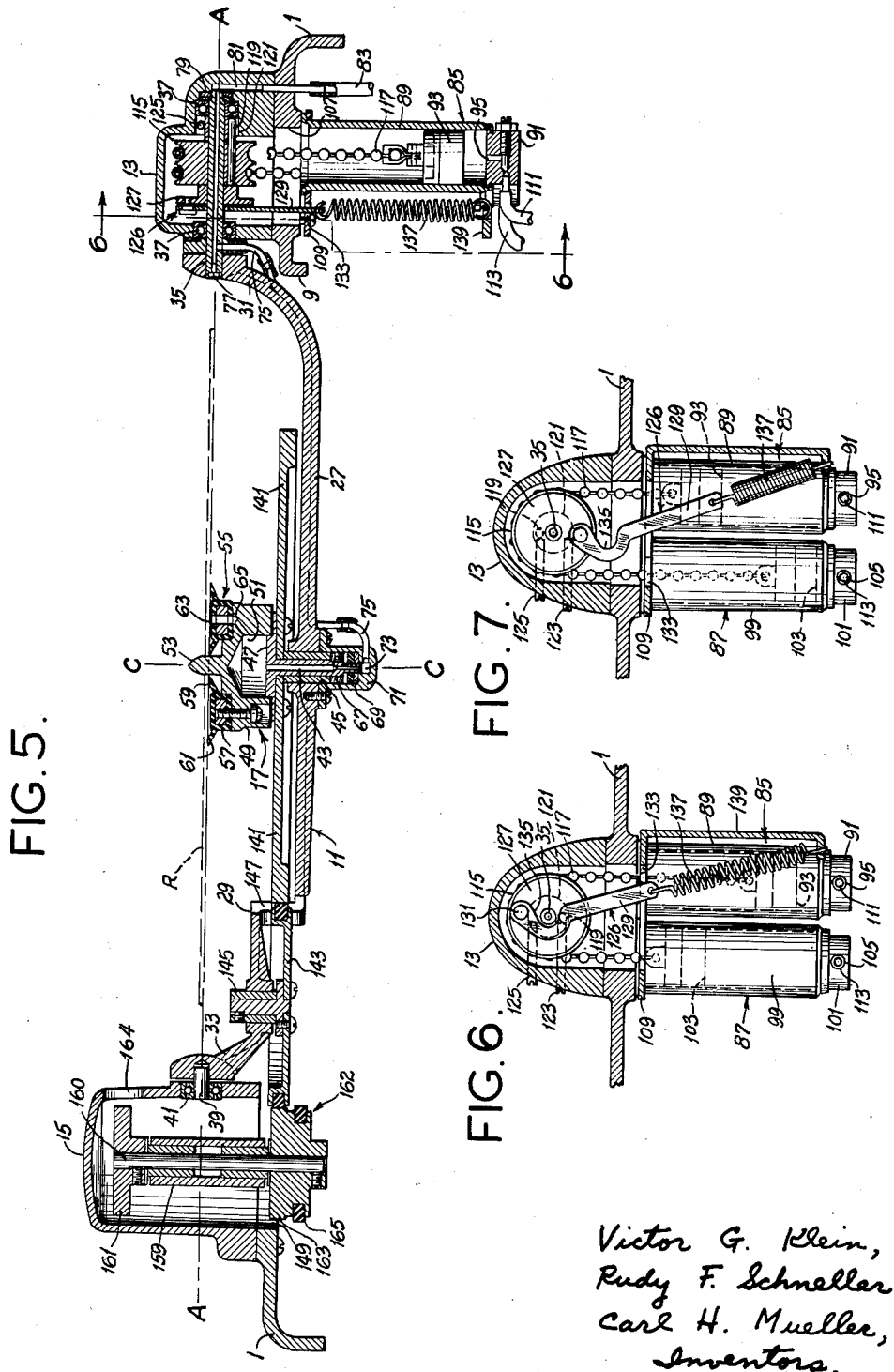

Feb. 21, 1956 V. G. KLEIN ET AL 2,735,683
RECORD PLAYER
Filed June 15, 1949 15 Sheets-Sheet 6
FIG. 10.
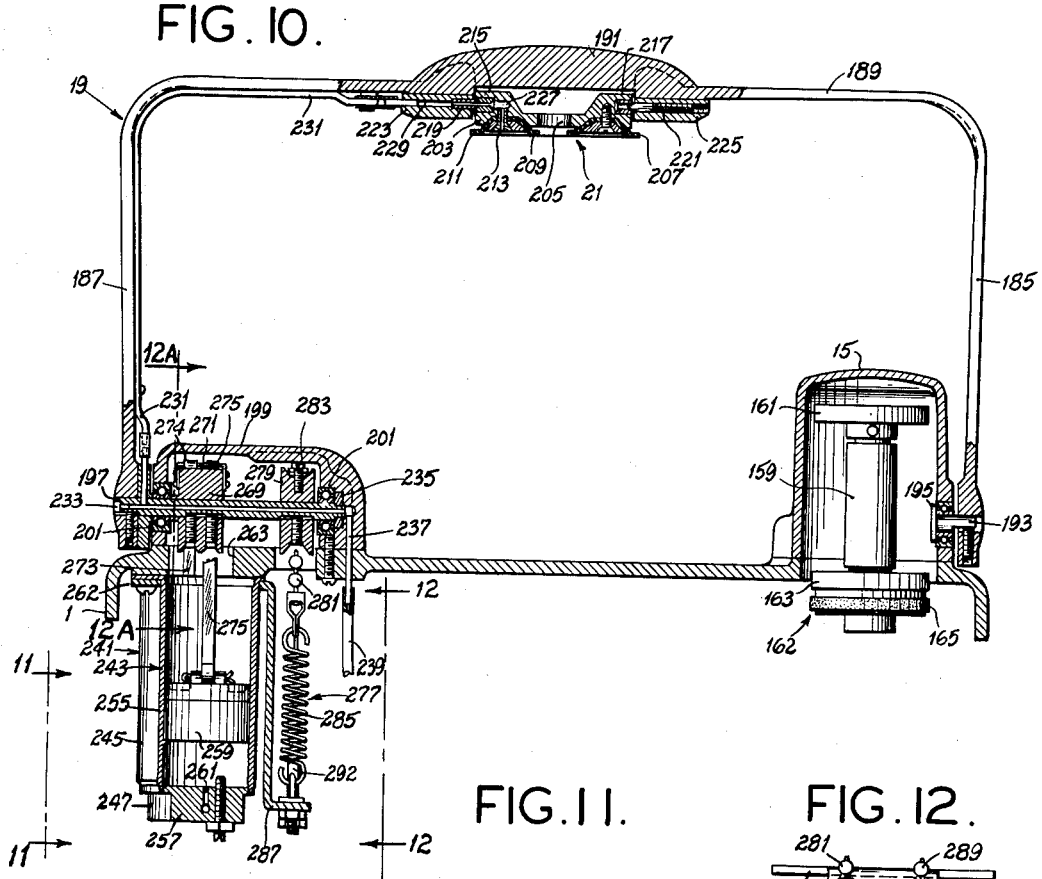
FIG. 11.
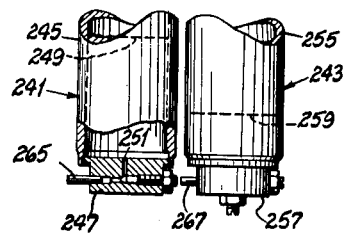
FIG. 12.
FIG. 12A.
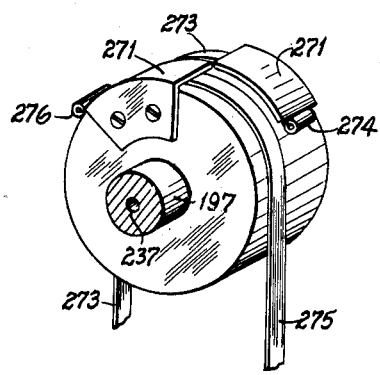
Victor G. Klein,
Rudy F. Schneller,
Carl H. Mueller,
Inventors,
Haynes and Koenig,
Attorneys.

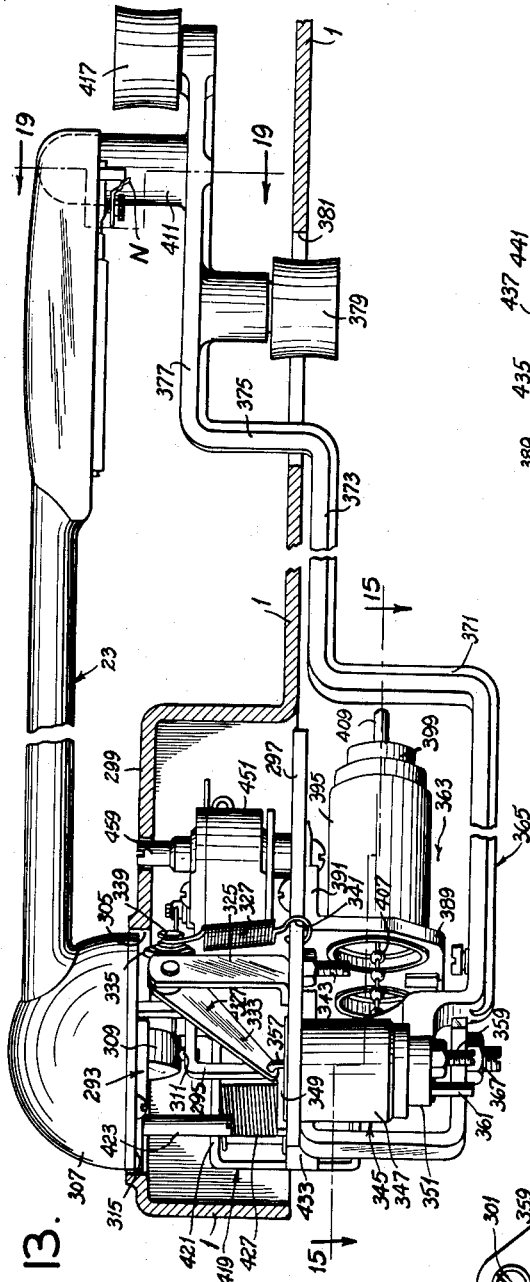
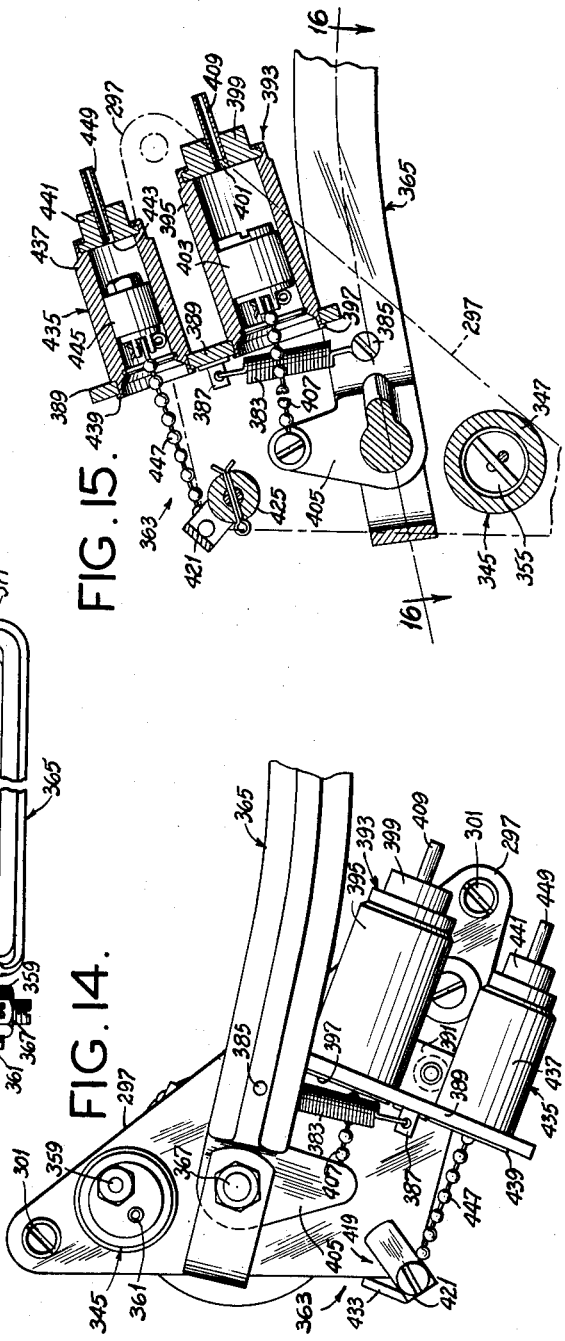

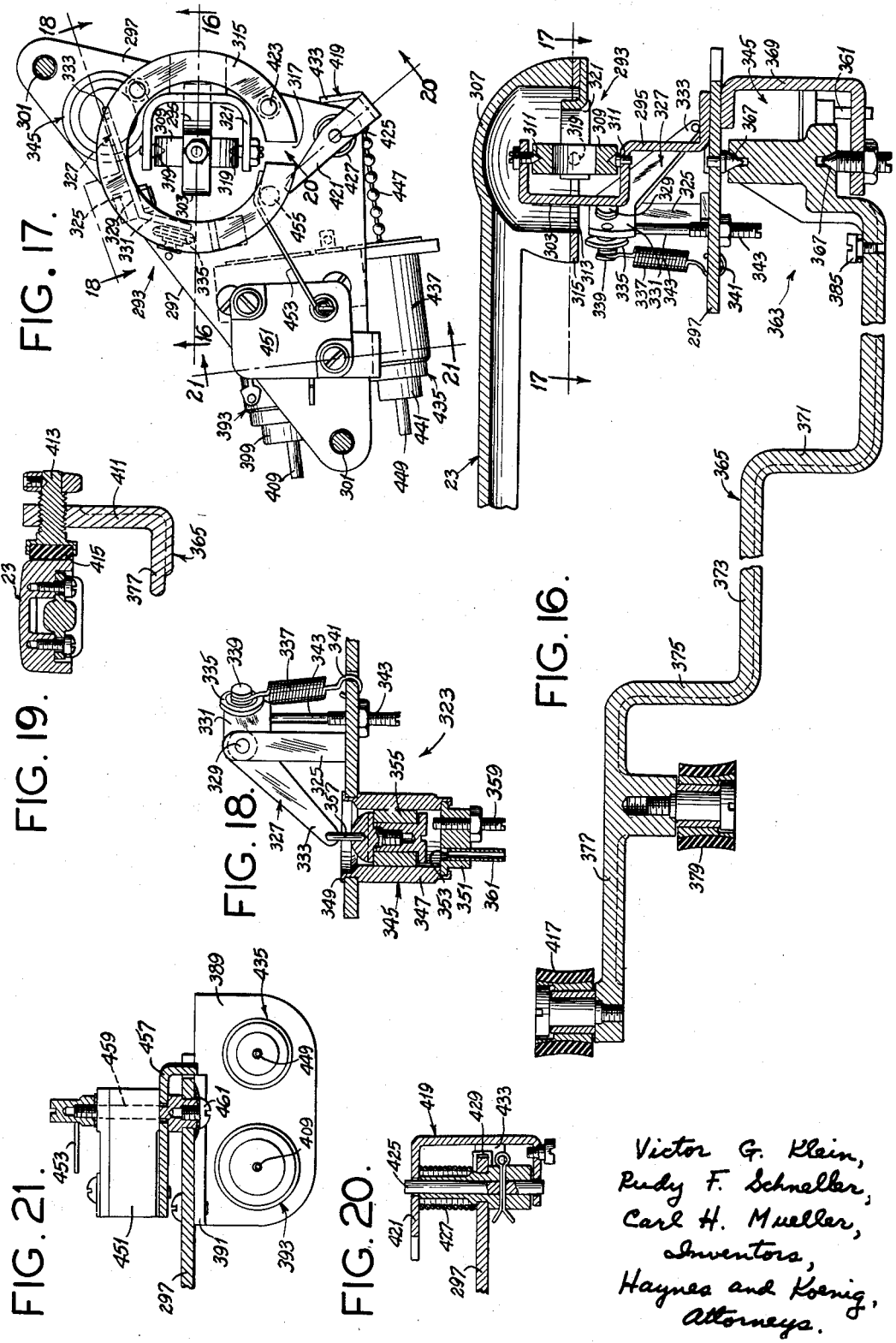

Feb. 21, 1956  V. G. KLEIN ET AL  2,735,683
RECORD PLAYER
Filed June 15, 1949  15 Sheets-Sheet 9
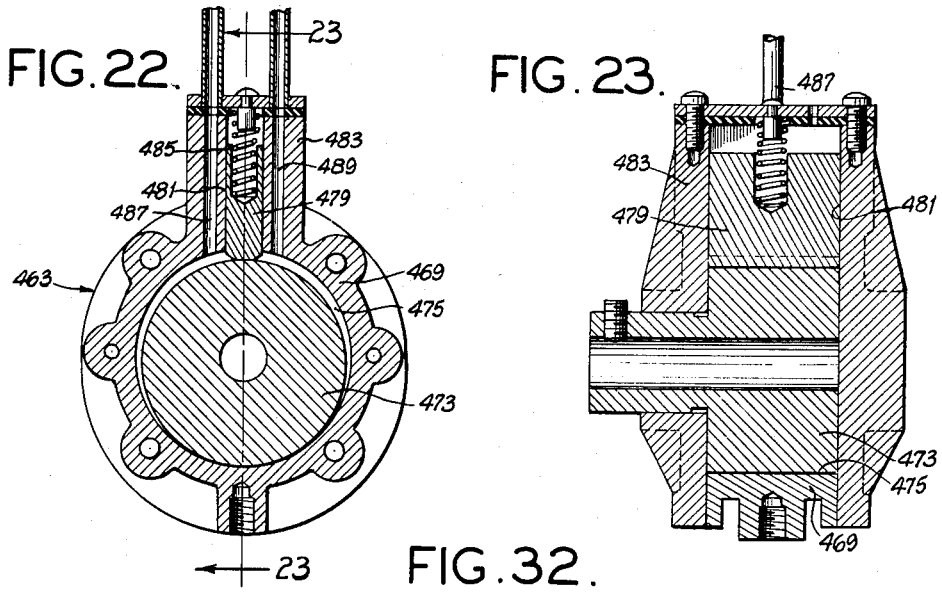
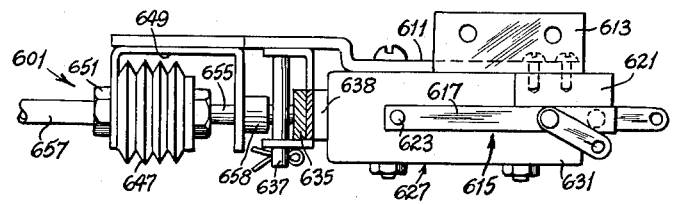
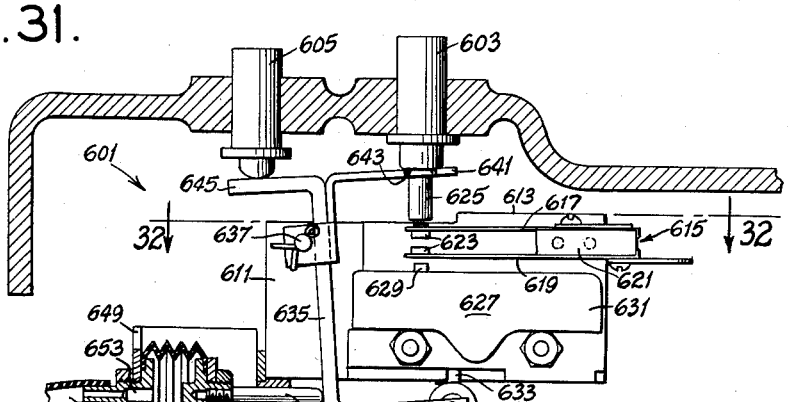
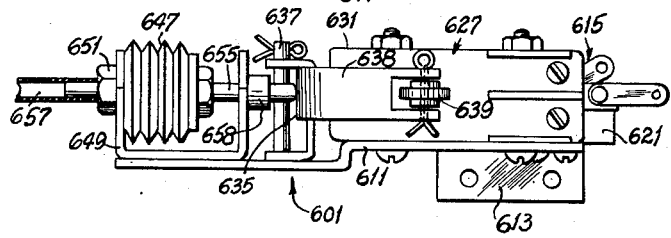
Victor G. Klein,
Rudy F. Schneller,
Carl H. Mueller,
Inventors,
Haynes and Koenig
Attorneys.

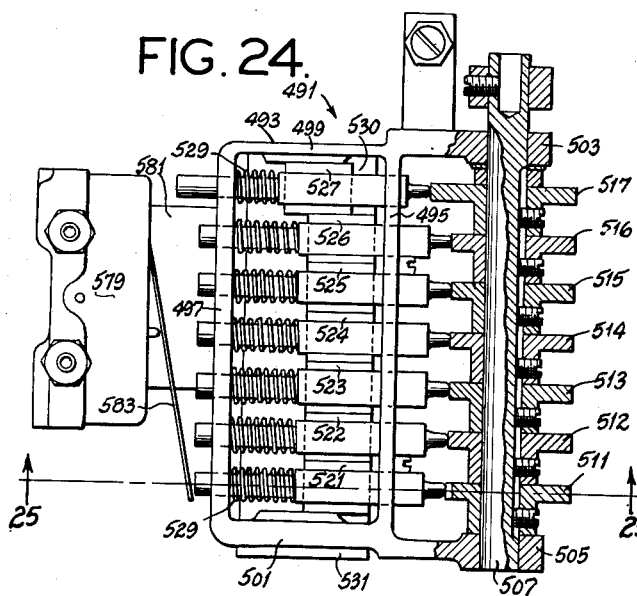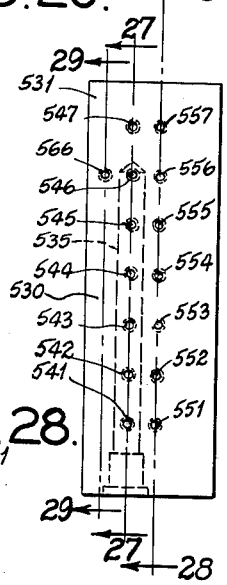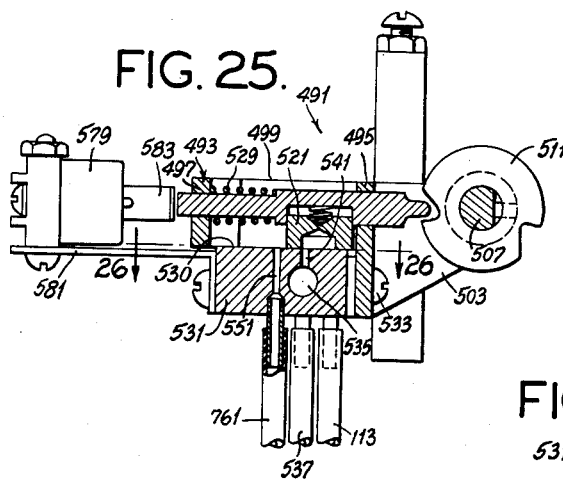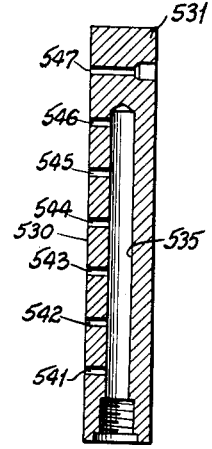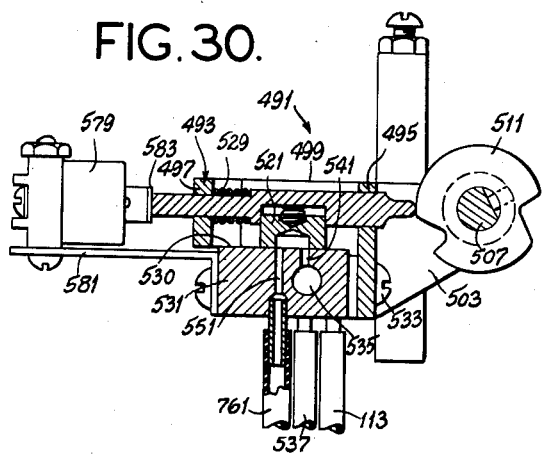

Feb. 21, 1956 V. G. KLEIN ET AL 2,735,683
RECORD PLAYER
Filed June 15, 1949 15 Sheets-Sheet 11

Victor G. Klein,
Rudy F. Schneller,
Carl H. Mueller,
Inventors,
Haynes and Koenig,
Attorneys.

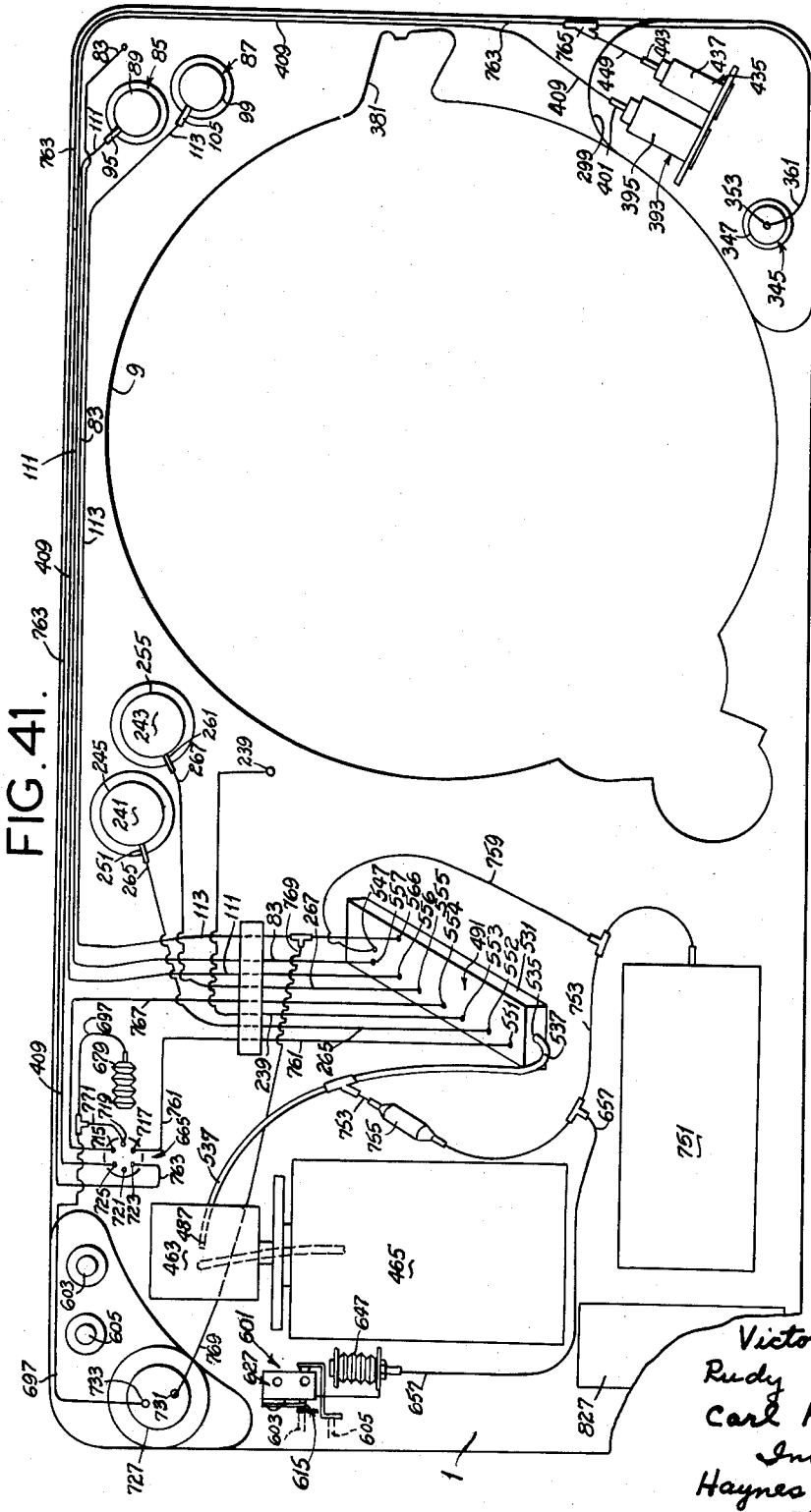

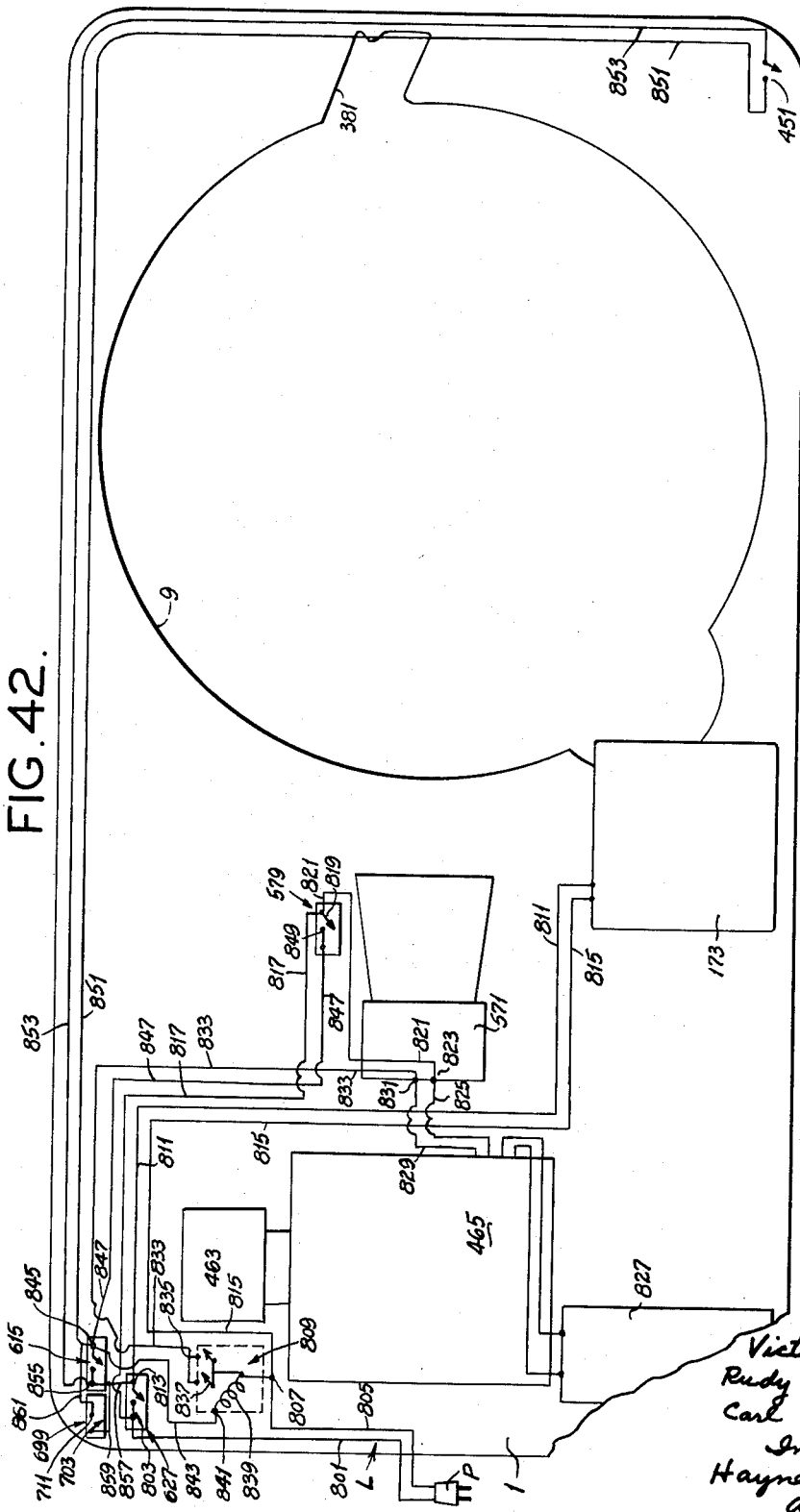

Feb. 21, 1956 V. G. KLEIN ET AL 2,735,683
RECORD PLAYER
Filed June 15, 1949 15 Sheets-Sheet 14

Victor G. Klein,
Rudy F. Schneller,
Carl H. Mueller,
Inventors,
Haynes and Koenig,
Attorneys.

Feb. 21, 1956 V. G. KLEIN ET AL 2,735,683
RECORD PLAYER
Filed June 15, 1949 15 Sheets-Sheet 15

Victor G. Klein,
Rudy F. Schneller,
Carl H. Mueller,
Inventors,
Haynes and Koenig,
attorneys.

United States Patent Office 2,735,683
Patented Feb. 21, 1956

2,735,683

RECORD PLAYER

Victor G. Klein and Rudy F. Schneller, St. Louis, and Carl H. Mueller, Ferguson, Mo., assignors to Lincoln Engineering Company, St. Louis, Mo., a corporation of Missouri Application June 15, 1949, Serial No. 99,151

17 Claims. (Cl. 274—10)

This invention relates to record players, and more particularly to record players of the so-called "double side" or "turnover" type.

This invention is an improvement upon the record player disclosed in the co-assigned copending application of Victor G. Klein and Carl H. Mueller for Record Changer, Serial No. 629,932, filed November 21, 1945, issued as Patent No. 2,601,301, June 24, 1952.

Among the several objects of the invention may be noted the provision of an improved, simplified record player for automatically selectively playing both sides of each record in a series of phonograph records in sequence, or one side of each record of a series, as desired; the provision of a record player of the class described which is of compact construction with its overall dimensions such as to permit convenient installation of the player where space may be limited, as in radio-phonograph cabinets or other furniture of size suitable for household use; the provision of a record player of this class adapted to play records of various sizes, particularly the standard ten and twelve inch records, intermixed in any sequence, without requiring any manual adjustments for the different sizes of records, and without any possibility of jamming or serious damage by mishandling; the provision of a record player of this class which handles records more speedily and gently than prior double side record players without danger of breakage; and the provision of a record player of this class which is troubleproof, easy to operate, and quiet during the playing of a record so as to provide for undisturbed listening pleasure. Other objects will be in part apparent and in part pointed out hereinafter.

The invention accordingly comprises the elements and combinations of elements, features of construction, and arrangements of parts, which will be exemplified in the structures hereinafter described, and the scope of the application of which will be indicated in the following claims.

In the accompanying drawings, in which one of various possible embodiments of the invention is illustrated, Fig. 1 (Sheet 1) is a perspective plan view of a record player embodying the invention, with the turntable of the record player illustrated in inverted position;

Fig. 4 (Sheet 4) is a perspective end elevation of Fig. 1 as viewed from the left;

Fig. 5 (Sheet 5) is an enlarged vertical section taken on line 5—5 of Fig. 1, with the turntable moved to upright position;

Fig. 6 (Sheet 5) is a vertical section taken on line 6—6 of Fig. 5;

Fig. 7 (Sheet 5) is a section similar to Fig. 6 but illustrating parts in the position they occupy when the turntable is inverted;

Fig. 8 (Sheet 4) is an enlarged vertical section taken on line 8—8 appearing in Figs. 1 and 4;

Fig. 9 (Sheet 4) is a plan view of Fig. 8 with covering parts omitted;

Fig. 10 (Sheet 6) is an enlarged section taken substantially on line 10—10 of Fig. 2;

Fig. 11 (Sheet 6) is a fragmentary detail view of Fig. 10 as viewed from the line 11—11 in Fig. 10, with parts broken away and shown in section;

Fig. 12 (Sheet 6) is a fragmentary detail view of Fig. 10 as viewed from the line 12—12 in Fig. 10;

Fig. 12A (Sheet 6) is an enlarged perspective detail section taken on line 12A—12A of Fig. 10;

Fig. 13 (Sheet 7) is an enlarged vertical section taken substantially on line 13—13 of Fig. 1, with parts broken away;

Fig. 14 (Sheet 7) is a fragmentary bottom plan of Fig. 13;

Fig. 15 (Sheet 7) is a horizontal section taken substantially on line 15—15 of Fig. 13;

Fig. 16 (Sheet 8) is a vertical section taken substantially on line 16—16 appearing in Figs. 15 and 17, with parts broken away;

Fig. 17 (Sheet 8) is a horizontal section taken substantially on line 17—17 of Fig. 16;

Fig. 18 (Sheet 8) is a vertical section taken on line 18—18 of Fig. 17;

Fig. 19 (Sheet 8) is a vertical section taken on line 19—19 of Fig. 13;

Fig. 20 (Sheet 8) is a vertical section taken on line 20—20 of Fig. 17;

Fig. 21 (Sheet 8) is a vertical section taken on line 21—21 of Fig. 17;

Fig. 22 (Sheet 9) is an enlarged vertical section taken on line 22—22 of Fig. 3;

Fig. 23 (Sheet 9) is a vertical section at right angles to Fig. 22, taken on line 23—23 of Fig. 22;

Fig. 24 (Sheet 10) is an enlarged detail elevation, with parts broken away and shown in section, as viewed from the line 24—24 in Fig. 3;

Fig. 25 (Sheet 10) is a section, looking upward, taken on line 25—25 of Fig. 24;

Fig. 26 (Sheet 10) is a view taken substantially on line 26—26 of Fig. 25;

Fig. 27 (Sheet 10) is a vertical section taken on line 27—27 of Fig. 26;

Fig. 28 (Sheet 10) is a vertical section taken on line 28—28 of Fig. 26;

Fig. 29 (Sheet 10) is a vertical section taken on line 29—29 of Fig. 26;

Fig. 30 (Sheet 10) is a section similar to Fig. 25, but illustrating parts in a moved position;

Fig. 31 (Sheet 9) is an enlarged vertical section taken substantially on line 31—31 of Fig. 1;

Fig. 32 (Sheet 9) is a horizontal section taken substantially on line 32—32 of Fig. 31;

Fig. 33 (Sheet 9) is a bottom plan view of Fig. 31;

Fig. 38 (Sheet 4) is an enlarged vertical section taken on line 38—38 of Fig. 4;

Fig. 39 (Sheet 4) is a horizontal section taken on line 39—39 of Fig. 38;

Fig. 40 (Sheet 4) is a section like Fig. 39 illustrating a moved position;

Fig. 41 (Sheet 12) is a diagram of the vacuum system of the record player superimposed on a bottom plan;

Fig. 42 (Sheet 13) is a wiring diagram superimposed on a bottom plan; and,

Similar reference characters indicate corresponding parts throughout the several views of the drawings.

Figure 1:
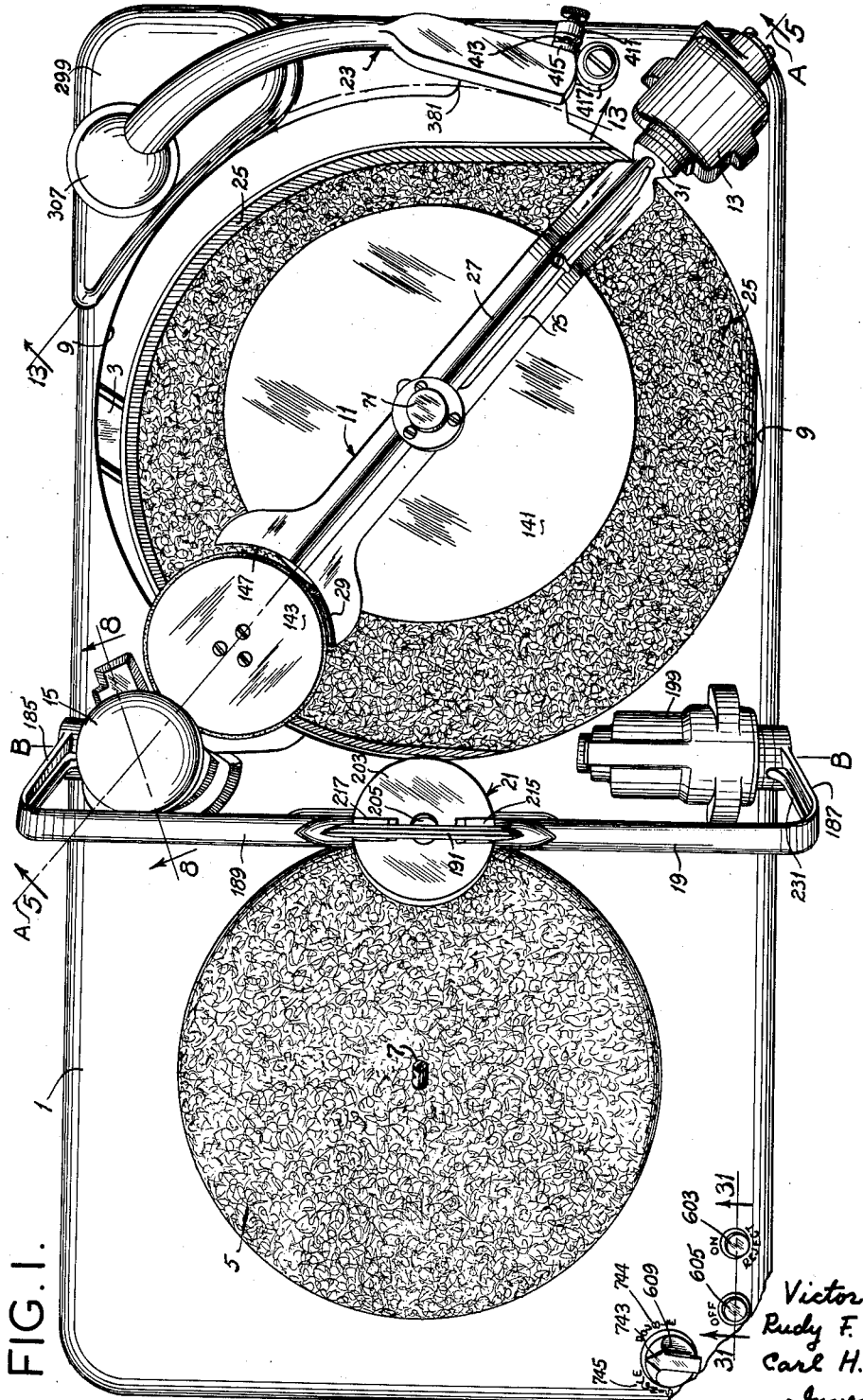

Referring to the drawings, first more particularly to Figs. 1-4, the record player of this invention is shown generally to have a supporting frame in the form of a rectangular deck or table 1 on legs 3. On the left half of the table, as viewed from what is considered the front of the record player, is a soft-surfaced raised circular platform 5 for supporting in an upright stack a supply of records R to be played. A curved pin 7 extends upward from the center of the platform through the center holes in the records for properly centering them. The right half of the table is apertured as indicated at 9. Extending diagonally across this aperture is a turntable cradle 11. This is journalled at its ends in hollow bearing castings 13 and 15 for pivotal movement about a horizontal axis A—A. It carries a vacuum-grip turntable 17 adapted to grip a record by vacuum only at the central ungrooved portion of the record to expose the playing grooves on both sides of the record.

The turntable cradle 11 and turntable 17 are swingable about axis A—A between an upright position (Fig. 5) wherein the turntable 17 faces upward and an inverted position (Figs. 1, 2 and 4) wherein it faces downward. At 19 is shown a record transfer arm pivoted for swinging movement about a horizontal axis B—B which extends transversely from the front to rear of the table substantially midway between the center of the turntable and the center of the record supply platform 5. A vacuum-grip record lifter 21 is pivoted on the record transfer arm. The latter, which extends upward from the turntable, is swingable on axis B—B between a position extending over the platform 5 to engage the record lifter 21 with the uppermost record of the supply stack and a position extending over the turntable (when the turntable is upright) to deposit a record thereon. At 23 is shown the tone arm of the record player. Below the aperture 9 in the table is a record receiver 25. This consists simply of an open-front soft-surfaced tray fixed in horizontal position to three of the table legs.

In general, a stack of records to be played is placed on the platform 5, centered on the pin 7. Initially, the turntable 17 is upright and the tone arm 23 is in an initial position about midway between its retracted position illustrated in Fig. 1 and the center of the turntable. After the record player is started, the tone arm is retracted, the turntable inverts and then swings back to upright position. Meanwhile, the transfer arm swings over the stack of records, and the vacuum-grip record lifter 21 engages the central portion of the upper face of the uppermost record of the stack. The record lifter is evacuated to grip the record, and the transfer arm swings away from the stack, lifting the uppermost record and transferring it to a centered position on the upright turntable. The vacuum grip of the record lifter is released and the record is thereupon gripped and rotated by the turntable. The tone arm swings inward to play the first side of the record. At the conclusion of playing this side of the record, the tone arm is retracted and the turntable inverted to invert the record. Assuming that both sides of the record are to be played, the tone arm then swings inward to play the other side of the record. At the conclusion of playing this side, the tone arm is retracted, the vacuum grip of the turntable is released, and the record drops flatwise into the record receiver 25. The turntable then swings back to upright position and the record transfer arm transfers the next record in the stack to the turntable, starting the next playing cycle. Assuming that only the first side of the record is to be played, the playing of the second side is omitted, the vacuum grip of the turntable on the record being released after the turntable has been inverted to drop the record into the record receiver.

The pivotal axis A—A of the turntable cradle 11 extends in a horizontal plane above the table diagonally across the aperture 9 from the right front corner of the table. The bearing casting 13 is fixed upon this corner of the table. The bearing casting 15 is fixed upon the table adjacent its rear edge and approximately centered in the transverse plane which lies substantially midway between the centers of the turntable and the record supply platform. The turntable cradle consists of a beam 27 having a stepped portion 29 offset toward the axis A—A and crank arms 31 and 33 at its ends (Fig. 5). A hollow trunnion 35 is fixed in crank arm 31, being journalled in bearings 37 located in opposite sides of the casting 13. A short trunnion 39 is fixed in the crank arm 33 and is journalled in a bearing 41 located in the side of the bearing casting 15 which faces the aperture 9. The latter is of somewhat larger diameter than the largest record which the record player is to accommodate.

The turntable 17 is mounted for rotation on an axis C—C at right angles to the axis A—A at the center of the turntable cradle 11. It is carried by a hollow turntable shaft 43 rotary in a bearing 45 located in the center of the cradle. The turntable shaft has a flange 47 on its end within the cradle. A cup 49 is fixed to this flange with the latter closing the mouth of cup to form a vacuum chamber 51. A record centering pin 53 extends outward from the base of the cup 49. Fixed to the cup 49 surrounding the pin 53 is an annular suction pad 55, of soft rubber or the like. This consists of a ring 57 of channel section having concentric inner and outer annular flexible lips 59 and 61. These define an annular channel 63. The diameter of the outer lip 61 is less than the diameter of the innermost groove of conventional records and greater than the diameter of the cup 49. A port 65 leads from channel 63 through the ring 57 and the wall of the cup 49 to the vacuum chamber 51.

The turntable shaft 43 is fixed against endwise movement in bearing 45 by means of a collar 67 secured to the shaft to engage that end of the bearing which extends outward from the cradle 11. The outer end of the turntable shaft extends through a packing 69 in a cap 71 fixed to the cradle. The passage through the turntable shaft opens into a port 73 in the cap outward of the packing. A pipe line 75 carried by the cradle 11 connects this port to the passage in the hollow trunnion 35 adjacent the inner end of the trunnion. The inner end of this passage is plugged as indicated at 77. The outer end of trunnion 35 extends through a packing 79 located in the bearing casting. Outward of the packing, the passage through the trunnion opens into a port 81 in the wall of the casting. A pipe line 83 leads from port 81 to the vacuum system of the record player to be described.

The turntable cradle 11 is adapted to be swung about its pivotal axis A—A through 180° between limiting positions determining the inverted and upright positions of the turntable 17 by a pair of vacuum motors 85 and 87 coupled to the trunnion 35. Motor 85 comprises a vertical cylinder 89 open at its upper end and having a head 91 closing its lower end. A piston 93 is vertically slidable in the cylinder 89. Cylinder head 91 is ported as indicated at 95. Motor 87 is duplicate of motor 85, comprising a vertical cylinder 99 open at its upper end, and having a head 101 closing its lower end. A piston 103 is vertically slidable in the cylinder 99. Cylinder head 101 is ported as indicated at 105. The two cylinders 89 and 99 are fixed under the table 1 by means of a collar plate 109 with their upper ends opening into the hollow bearing casting 13 through an opening 107 in the table. Pipe lines 111 and 113 connect ports 95 and 105, respectively, into the vacuum system of the record player.

Fixed on the trunnion 35 within the casting 13 is a pulley 115. The piston 93 of motor 85 and the piston 103 of motor 87 are connected to the pulley by bead chains 117 in such manner that when piston 93 moves downward the pulley is rotated clockwise as viewed in Figs. 6 and 7, and when piston 103 moves downward the pulley is rotated in the opposite direction. A pin 119 is fixed in the pulley and extends axially outward from the outer side of the pulley into the recess 121 in the wall of the bearing casting 13 in which the outer trunnion bearing 37 is located. Two set screws 123 and 125 are adjustably threaded through the wall of the casting to extend into the recess 121 to serve as limiting stops for engagement by the pin 119. These screws are adjusted to limit rotation of the pin to 180° and to determine the limiting positions of the turntable cradle 11 for positioning the turntable 17 in its upright and inverted positions. With the pin 119 in position engaging stop 123 (Fig. 6), the cradle extends vertically downward from its trunnions and the turntable 17 is upright. With the pin rotated 180° from the aforesaid position and engaging stop 125 (Fig. 7), the cradle extends vertically upward from its trunnions and the turntable is inverted.

When the turntable 17 is upright, with pin 119 engaging stop 123, the piston 93 of motor 85 is in its lowermost position and the piston 103 of motor 87 is in its uppermost position (Figs. 5 and 6). To invert the turntable, the cylinder 89 of motor 85 is vented to atmosphere through port 95 and line 111 and the cylinder 99 of motor 87 is exhausted through port 105 and line 113. Atmospheric pressure in cylinder 99 above piston 103 thereupon drives this piston downward and the chain 117 connecting piston 103 and pulley 115 rotates the pulley to rotate the turntable cradle 11 until pin 119 engages the stop 125, at the same time pulling up the piston 93 of motor 85. To return the turntable to upright position, the cylinder 89 of motor 85 is exhausted through port 95 and line 111 and the cylinder 99 of motor 87 is vented through port 105 and line 113. Atmospheric pressure in cylinder 89 above piston 93 thereupon drives this piston downward and the chain 117 connecting piston 93 and pulley 115 rotates the pulley to swing the cradle 11 until pin 119 engages stop 123, at the same time pulling up the piston 103 of motor 87.

Overcentering mechanism 126 is provided to hold the turntable 17 in its upright and inverted positions. As shown in Figs. 5–7, this mechanism comprises a disc 127 fixed on the trunnion 35 adjacent the inner side of pulley 115 within the bearing casting 13. A link 129 is pivotally connected to the disc at 131. The link extends downward out of the casting 13 through the opening 107 in the table and an opening 133 in the collar plate 109. It has a notch 135 accommodating the trunnion when the link is in its raised position of Fig. 6, wherein connection 131 is above the trunnion. A tension spring 137 is connected between the lower end of the link and a spring connector plate 139 formed as a part of the collar plate 109. The pivot connection 131 overcenters as the turntable cradle swings between its limiting positions so that the spring holds the cradle in one or the other of these positions with pin 119 engaging one or the other of stop 123 or 125. The spring 137 also functions to counterbalance the weight of a turntable flywheel 141 fixed on the turntable shaft 43 between the cradle 11 and the turntable 17.

The flywheel 141 also serves as a friction gear in a turntable drive which is adapted to drive the turntable clockwise as viewed from above whether the turntable is upright or inverted, for properly playing records. The turntable drive includes an idler friction gear 143 carried by the cradle 11 in mesh with the flywheel. Gear 143 is journalled in a bearing 145 in the stepped portion 29 of the cradle beam 27 and is located in the recess defined by the stepped portion on the opposite side of the cradle beam 27 from the flywheel. That is, for example, when the turntable is upright as illustrated in Fig. 5, the flywheel is above the beam and the gear 143 is below the beam. The flywheel and the gear come into mesh in an opening 147 in the step of the stepped portion 29.

The bearing casting 15 is open at its bottom, and is fixed to the top of the table 1 over an opening 149 in the table. A stud 151 (Fig. 8) is threaded at its upper end into the bottom of the table adjacent opening 149 on the side thereof toward the right side of the table to extend downward from the bottom of the table. A bracket 153 is pivoted on the stud, being held on the stud by a collar 155 fixed on the lower end of the stud. The bracket is formed with an arm 157 which extends upward into the opening 149 and with a vertical shaft bearing 159 at the upper end of the arm. This bearing extends upward into the hollow bearing casting 15. A shaft 160 is rotary in the bearing 159. On the upper end of the shaft is fixed a friction gear 161. On the lower end of the shaft is fixed a friction gear cluster 162 comprising an upper gear 163 and a lower gear 165.

The gear 161 and the gear 163 are axially spaced a distance corresponding to the throw of the idler gear 143, and are equally spaced above and below the axis A—A of the turntable cradle 11. When the turntable is in upright position, the idler gear is in mesh with the gear 163 (Fig. 5). When the turntable is swung to inverted position, the idler gear is swung around and upward into mesh with the upper gear 161. The casting 15 has an opening 164 (Fig. 5) for receiving the gear 143 when the turntable is in inverted position. The bracket is biased to swing toward the idler gear by a spring 166 (Fig. 3) to bias gear 161 or gear 163, as the case may be, into frictional engagement with the idler gear.

The bracket 153 has a horizontal arm 167 (Figs. 8 and 9) extending under the gear cluster 162. Attached to the bottom of this arm as by screws 169 is a plate 171. An electric motor 173 is hung from the plate 171 by resilient anti-vibration fastenings 175 with its shaft 177 extending vertically upward through an opening 178 in the plate and the arm 167. On motor shaft 177 is a friction pinion 179 which meshes with the lower gear 165 of cluster 162. A tension spring 181 is connected between one of the fastenings 175 and a finger 183 extending from the bracket arm 167 to bias the pinion 179 into engagement with gear 165, fastenings 169 being loose and permitting the motor to have sufficient play for this purpose.

The motor shaft 177 and pinion 179 rotate counterclockwise as viewed from above and consequently drive the gears 161 and 163 clockwise. When the idler gear 143 is in mesh with gear 163 with the turntable upright, the idler gear is driven counterclockwise and drives the turntable clockwise, as viewed from above. Similarly, when the idler gear 143 is in mesh with the gear 161 with the turntable inverted, the idler gear is also driven counterclockwise and drives the turntable clockwise, as viewed from above. Thus, a record gripped by the turntable is driven in proper direction for cooperation with the tone arm 23 when either its first or second side is being played. It will be noted that while the direction of rotation of the turntable remains the same as viewed from above, when the turntable is swung from upright to inverted position, its rotation actually reverses with respect to the cradle 11.

The pivotal axis A—A of the turntable cradle 11 is located to pass through the central transverse plane of the record gripped by the turntable. Thus, when the turntable is upright, the first side of a record gripped thereon (the uppermost side) lies in a horizontal plane just above the axis A—A. When the turntable is inverted to play the second side of the record, the second side becomes the uppermost side and lies in substantially the same horizontal plane. Thus, both sides of a record are positioned at proper elevation for cooperation with tone arm 23. As previously pointed out, both sides are also rotated in proper direction for cooperation with the tone arm.

The record transfer arm 19 resembles a bail, being of inverted U-shape, having side arms 185 and 187 and a horizontal upper bar 189 extending between the upper ends of the side arms (Figs. 1, 4 and 10). The bar 189 has a narrow central portion 191. The side arms are far enough apart to permit a record of the largest size which the record player is to accommodate to pass flatwise between the arms. Fixed in the lower end of the arm 185, which is the arm at the rear of the record player, is a short trunnion 193. This extends inward from the arm and is journalled in a bearing 195 located in the rearward portion of the wall of the bearing casting 15. Fixed in the lower end of the arm 187 is a longer and hollow trunnion 197. This extends inward from the arm coaxial with trunnion 193 through a hollow bearing casting 199 and is journalled in bearings 201 located in opposite walls of this casting. The latter is fixed upon the table 1 adjacent its forward edge and with bearings 201 in the vertical transverse plane substantially midway between the center of the turntable 17 and the center of the record supply platform 5. Bearings 201 and bearing 195 determine the horizontal pivotal axis B—B of the record transfer arm, this axis extending transversely just above the table and in the aforesaid vertical plane.

The vacuum-grip record lifter 21 is pivotally suspended from the horizontal bar 189 of the record transfer arm at the center of the bar. The record lifter comprises a ring 203, the central aperture of the ring being designated 205. Fixed to the lower face of the ring surrounding its central aperture is an annular suction pad 207, of soft rubber or the like, consisting of a ring of channel section having inner and outer annular flexible lips 209 and 211. These define a downwardly opening channel 213. The ring 203 has diametrically opposed outwardly opening pivot bearing apertures 215 and 217. Pivot pins 219 and 221 extend from blocks 223 and 225 fixed to the bar 189 into the apertures 215 and 217, respectively, for pivotally mounting the record lifter on the bar.

The bearing aperture 215 is in communication with the channel 213 through a port 227. The pivot pin 219 which extends into the bearing aperture 215 is hollow and projects from the inner end of a passage 229 extending through the block 223. A pipe line 231 connects the outer end of the passage 229 and the passage in the hollow trunnion 197. This line is carried under the bar 189 and on the inside of the arm 187. The outer end of the passage in the trunnion 197 is plugged as indicated at 233. The inner end of the trunnion 197 extends through a packing 235 located in the casting 199, and the passage through the trunnion opens into a port 237 in the wall of the casting. A pipeline 239 leads from port 237 through the table 1 to the vacuum system of the record player. It will be seen that by pressing the suction pad 207 against the face of a record and by evacuating the channel 213 through port 227, bearing aperture 215, hollow pivot pin 219, passage 229, pipe 231, the passage through trunnion 197, port 237 and pipe 239, the record will be gripped to the record lifter 21 so that it may be lifted thereby.

The pivotal connection of the record lifter 21 to the bar 189 of the record transfer arm 19 is sufficiently free to permit the lower face of the record lifter to remain more or less horizontal as the transfer arm swings from side to side. As the record transfer arm swings over the record supply platform 5, the curved record-centering pin 7 enters the central aperture 205 in the ring 203 of the record lifter 21. The pin 7 is curved generally on an arc having its center substantially in the pivotal axis B—B of the record transfer arm and having the same radius as the center of the lower record-engaging face of the record lifter 21. The record-centering pin 53 of the turntable is located at this same radius in respect to axis B—B. Consequently, when the record transfer arm swings over the upright turntable, pin 53 enters the central aperture in a record gripped by the record lifter and the central aperture 205 in the record lifter ring 203. The pin 53 is so short that it need not be curved.

The record transfer arm 19 is adapted to be swung about its pivotal axis B—B for transferring records from the record supply platform 5 to the turntable 17 by a pair of vacuum motors 241 and 243 coupled to the trunnion 197. Motor 241 comprises a vertical cylinder 245 open at its upper end and having a head 247 closing its lower end. A piston 249 is vertically slidable in the cylinder. Cylinder head 247 is ported, as indicated at 251. Motor 243 is a duplicate of motor 241, comprising a vertical cylinder 255 open at its upper end, and having a head 257 closing its lower end. A piston 259 is vertically slidable in the cylinder 255. Cylinder head 257 is ported, as indicated at 261. The two cylinders 245 and 255 are fixed under the table 1 by means of a collar plate 262 with their upper ends opening into the hollow bearing casting 199 through an opening 263 in the table. Pipe lines 265 and 267 connect ports 251 and 261, respectively, into the vacuum system of the record player.

Fixed on the trunnion 197 within the casting 199 is a pulley 269. Clips 271 are secured to the pulley as illustrated in Fig. 12A. A semi-flexible band 273 is fastened at one end to the piston 249 of motor 241, extends upward from the piston, and is trained around the pulley in one direction slidably through one of the clips, having a head 274 at its other end. A similar band 275 is fastened at one end to the piston 259 of motor 243, extends upward from the piston, and is trained around the pulley in the other direction slidably through the other clips, having a head 276 at its other end. Upon venting the cylinder 255 of motor 243 to atmosphere through port 261 and line 267 and by evacuating cylinder 245 of motor 241 through port 251 and line 265, atmospheric pressure in cylinder 245 above piston 249 drives this piston downward and the band 273 connected between the piston and the pulley rotates the pulley counterclockwise as viewed from the front of the record player to swing the record transfer arm 19 toward the record supply platform 5. This raises piston 259. Upon venting the cylinder 245 of motor 241 through port 251 and line 265 to atmosphere, and evacuating cylinder 255 of motor 243 through port 261 and line 267, atmospheric pressure in cylinder 255 above piston 259 drives this piston downward and the band 275 connected between this piston and the pulley rotates the pulley clockwise as viewed from the front of the record player to swing the record transfer arm toward the turntable. This raises the piston 249.

The weight of the record transfer arm 19, record lifter 21, and a record gripped by the lifter, is counterbalanced by a spring counterbalance mechanism generally designated 277. As shown in Figs. 10 and 12, this counterbalance mechanism comprises a pulley 279 fixed on the trunnion 197 within the casting 199 inward of the pulley 269. A bead chain 281 is fastened at one end to the pulley 279 at 283, trained around the pulley in one direction, and tensioned by a tension spring 285 connected between the other end of the chain and a fastener 286 fixed in a spring connector plate 287 formed as a part of collar plate 262. Another bead chain 289 is fastened at one end to the pulley 279 at 283, trained around the pulley in the other direction, and tensioned by a tension spring 291 connected between the other end of the chain and a fastener 292 slidable in the spring connector plate 287. As the record transfer arm 19 swings clockwise from the record supply to the turntable, spring 291 becomes tensioned, and as it swings in the other direction spring 285 becomes tensioned. Spring 285 counterbalances the weight of the transfer arm and biases the arm to the neutral position illustrated in Figs. 1, 2, 4 and 10. It is tensioned when the transfer arm swings from its neutral position toward the record supply stack. Spring 291 does not become tensioned until the transfer arm swings past its neutral position toward the turntable. Thus, it offsets the load of a record carried by the transfer arm. The slidable lost-motion connection between the bands 273 and 275 and the pulley 269 allows the transfer arm to return to neutral position without buckling of the bands.

The tone arm 23 is pivoted at the right rear corner of the table to swing both horizontally and vertically. In its retracted position it extends forward along the right side of the table, clear of the aperture 9 in the table. It is mounted for both horizontal and vertical swinging movement by means of a gimbal joint, generally designated 293 (Figs. 16 and 17). As shown, this joint comprises a post 295 extending upward from a horizontal triangular base plate 297 mounted below a raised portion 299 of the table at its right rear corner on studs 301 which extend down from 299. The post 295 has a C-shaped upper end portion 303, which extends through an opening 305 in the raised corner portion 299 of the table into the dome-shaped rearward end 307 of the tone arm. A gimbal ring 309 is pivoted for swinging movement about a vertical axis in the C-shaped portion 303 on bearings 311. Fastened to the lower edge of the dome 307, which is open as indicated at 313, is a flat ring of wear-resistant material forming a circular track 315 having a gap at 317. The tone arm is pivoted to the gimbal ring for swinging movement about a horizontal axis on bearings 319. These are carried by a yoke 321 extending inward from the lower edge of the dome. The tone arm may swing horizontally with the gimbal ring about the vertical axis of bearings 311. It is equipped with a conventional high fidelity replaceable needle crystal pick-up, the needle being shown at N, and carries suitable wiring for connection to an amplifier, as will be readily understood.

The tone arm must be swung inwardly about its vertical pivotal axis from its retracted position while lifted to position the needle N immediately above the outer end of the playing groove of a record on the turntable, then lowered to enter the needle in the groove. It must also be free to swing horizontally across the record as the needle is tracked toward the center of the record by the playing groove. At the termination of the playing of a side of a record, the tone arm must be lifted to raise the needle out of the groove and then swung outward and returned to its retracted position. Figs. 13–21 particularly illustrate the tone arm mechanisms of the record player for accomplishing these ends.

Mechanism for raising the tone arm from and lowering it onto a record carried by the turntable is generally designated 323 in Fig. 18. As shown, this mechanism comprises a post 325 extending upward from the base plate 297. A tone arm lifting lever 327 is pivoted to rock on a horizontal axis at the upper end of this post, as indicated at 329. The lever has a generally horizontal arm 331 extending under the circular track 315 and generally tangential thereto (Fig. 17), and an arm 333 inclined downward from the pivot 329 toward the base plate. The pivot 329 extends through the upper end of the inclined arm 333. The arm 331 is bent laterally to extend at an angle to the inclined arm 333. At the outer end of the horizontal arm 331 of the lifting lever is a roller 335 adapted for rolling engagement with the track. This roller is located under the track between the gimbal joint 303 and the outer free end of the tone arm so that when the roller is elevated it lifts the tone arm. The axis of the roller extends generally radially of the circular track so that, when the roller is elevated and receives the weight of the tone arm, it rotates and provides an anti-friction roller bearing for the tone arm as the latter swings horizontally about its vertical pivotal axis.

The tone arm lifting lever 327 is biased to swing the roller 335 downward to a lowered, retracted position by a tension spring 337 connected at 339 to the stud on which the roller is mounted and at 341 to the base plate 297. This retracted position of the lifting lever, and, consequently, the lowered, idle position of the tone arm, is determined by a vertical stop pin 343 adjustably threaded in and extending upward from the base plate with its upper end engageable by the lower edge of the arm 331 of the lever. The lifting lever is adapted to be rocked counterclockwise as viewed in Fig. 18 to raise the roller to elevate the tone arm by a vacuum motor 345. The latter comprises a cylinder 347 having an open upper end riveted in an opening in the base plate 297 as indicated at 349. The lower end of the cylinder is closed by a head 351, which is ported as indicated at 353. A piston 355 is vertically slidable in the cylinder and is linked to the end of the inclined arm 333 of lifting lever 327 as indicated at 357. A screw 359 is threaded vertically through the cylinder head 351 to function as a stop for limiting downward movement of the piston and thus limiting the amount the tone arm is raised. A pipe line 361 connects port 353 into the vacuum system of the record player. Upon evacuating the cylinder 347 through port 353 and line 361, atmospheric pressure above the piston 355 drives the piston downward to rock the lever 327 counterclockwise as viewed in Fig. 18 against the tension of spring 337, thereby raising the roller 335 into engagement with track 315 and lifting the tone arm.

Mechanism for swinging the tone arm inwardly from its retracted position to proper playing position for records of different diameters, which also permits the tone arm to be swung freely across the record by the tracking action of the needle in the playing groove, is generally designated 363 in Figs. 13–16. As shown, this mechanism comprises a lever 365 for pushing the tone arm inward from retracted position to playing position. This lever is pivoted at its rearward end for swinging movement in a horizontal plane about a vertical axis substantially coincident with the vertical axis of the tone arm on bearings 367. The latter are fixed in the base plate 297 and a C-shaped bracket 369 carried by and under the base plate. The tone arm pusher lever 365 is stepped upward as indicated at 371 to have a horizontal section 373 just under the table 1, and is further stepped upward as indicated at 375 to have a horizontal extension 377 which is above the table, but below the level of a record on the turntable.

Figure 3:
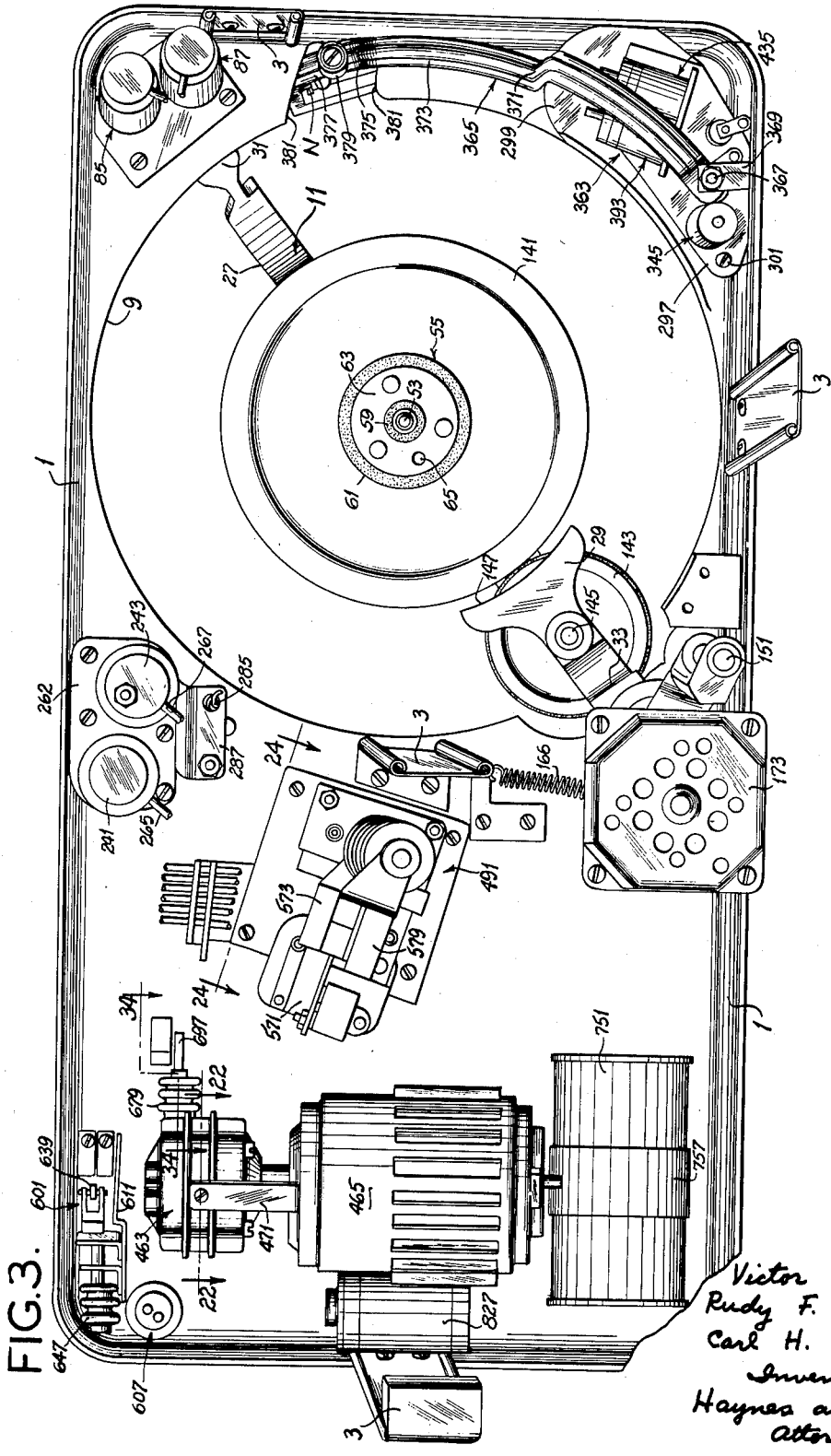
Fig. 3 (Sheet 3) is a perspective bottom plan of Fig. 1.
Figure 34:
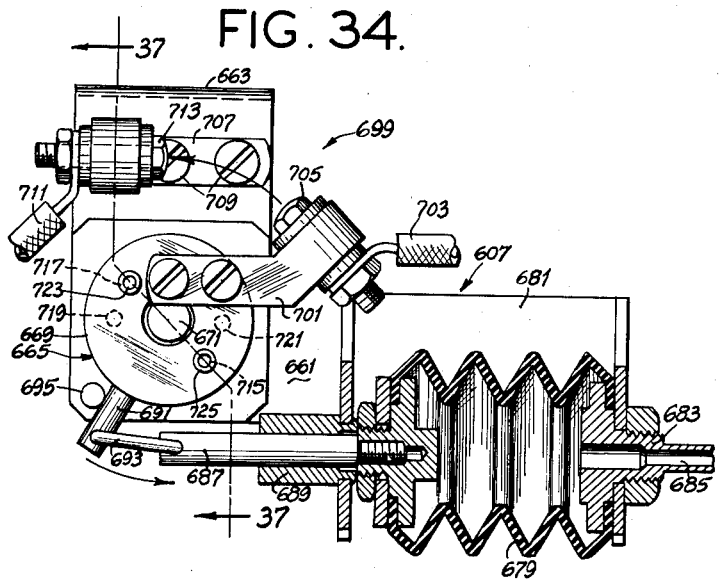
Fig. 34 (Sheet 11) is an enlarged vertical section taken substantially on line 34—34 of Fig. 3.
Figure 36:
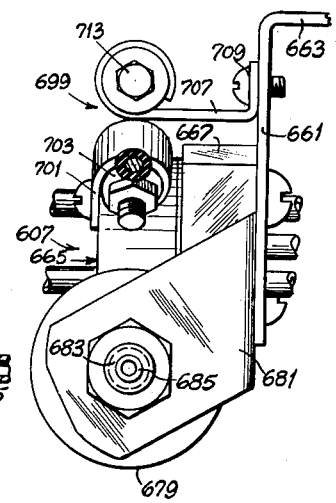
Fig. 36 (Sheet 11) is an end elevation of Fig. 34.
Figure 35:
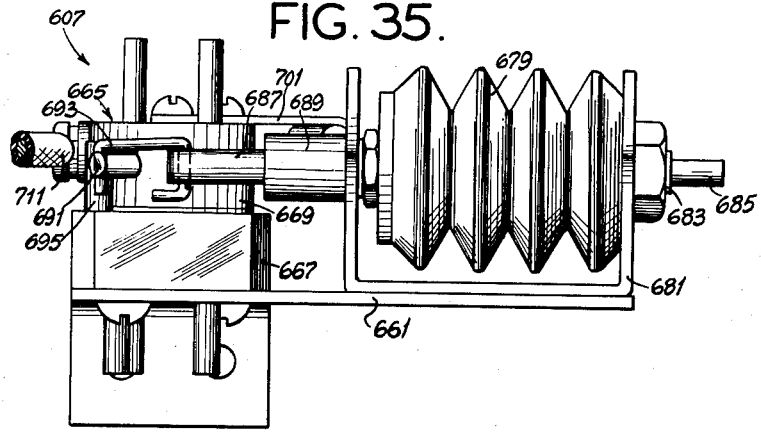
Fig. 35 (Sheet 11) is a bottom plan view of Fig. 34.
Figure 37:
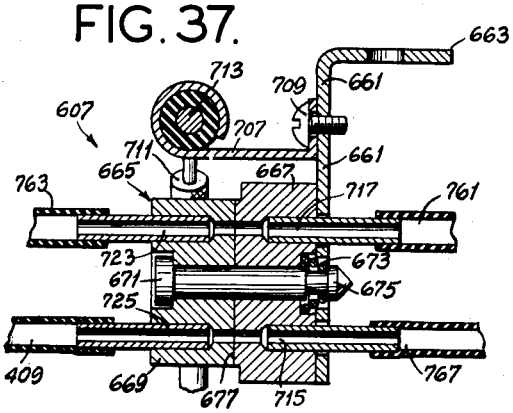
Fig. 37 (Sheet 11) is a section taken on line 37—37 of Fig. 34.

The lever 365 normally occupies a retracted position, clear of the aperture 9 in the table, wherein it extends forward from its pivotal axis along the right side of the table (Fig. 3). This position is determined by engagement of a resilient roller 379 on the lever with the end of a slot 381 (Figs. 1 and 3) in the table. The roller is carried at the inner end of and under the horizontal extension 377 in the plane occupied by the flywheel 141 when the turntable is upright. Slot 381 opens into the aperture 9 in the table and extends from aperture 9 toward the right side of the table to receive the step 375 of the lever 365 and the roller 379. The lever is biased toward its retracted position by a tension spring 383 connected to the lever adjacent its pivot at 385 and to a stud 387 fixed on the downwardly extending vertical flange plate 389 of an angle bracket 391 having its horizontal leg fastened to the bottom of the base plate 297.

The lever 365 is adapted to be swung inward toward the aperture 9 by a vacuum motor 393 (Fig. 15). This motor comprises a horizontal cylinder 395 having an open end riveted in an opening in the vertical flange plate 389 as indicated at 397. The other end of the cylinder is closed by a head 399, which is ported as indicated at 401. A piston 403 is horizontally slidable in the cylinder and is linked to an arm 405 of the lever by a bead chain 407. A pipe line 409 connects port 401 into the vacuum system of the record player. Upon evacuating the cylinder 395 through port 401 and line 409, atmospheric pressure in the open end of the cylinder drives the piston 403 toward the head 399 to swing the lever 365 clockwise, as viewed from above, against the bias of spring 383. When the cylinder 395 is vented to atmosphere through port 401 and line 409, spring 383 swings the lever back to retracted position.

The horizontal extension 377 of the lever 365 is formed with an upwardly extending post 411 adjacent its forward free end (Figs. 1, 13 and 19). Adjustably threaded in this post is a stud 413 carrying a resilient pad 415 for engaging the right side of the tone arm adjacent the free end of the tone arm. A resilient roller 417 is mounted at the forward end of the horizontal extension 377 of lever 365 forward of the end of the tone arm and extends upward from extension 377 into the plane occupied by a record gripped by the turntable. The arrangement is such that when the lever 365 is swung inward, it pushes the tone arm inward until the roller 417 engages the periphery of a record gripped by the turntable. Inward movement of the lever is limited by engagement of the roller with the record. This positions the needle N of the tone arm above the outer end of the playing groove of the record. The tone arm is then lowered to enter the needle in the outer end of the playing groove, and thereafter is swung freely across the record by the tracking action of the needle in the groove. Stud 413 may be adjusted so as properly to locate the needle in respect to the periphery of a record. It will be noted that this arrangement automatically provides for playing records of different diameters.

Mechanism for swinging the tone arm outward to its retracted position upon the termination of the playing of a side of a record is generally designated 419 in Figs. 17 and 20. As shown this mechanism comprises a tone arm return lever 421 engageable with a pin 423 which extends downward from the rearward end of the tone arm. The lever 421 is pivoted on a vertical axis for swinging movement in a horizontal plane above the base plate 297 by means of a vertical pin 425 fixed in the base plate. A torsion spring 427 having one end fixed to the base plate at 429 and its other end fixed to the lever biases the lever counterclockwise as viewed from above to a retracted position determined by engagement of a finger 433 on the lever with the edge of the base plate. The spring 427 surrounds the pin 425, being located between the base plate and the lever.

The tone arm return lever 421 is adapted to be swung clockwise as viewed from above against the bias of spring 427 by a vacuum motor 435 (Figs. 15 and 17). This comprises a horizontal cylinder 437 having an open end riveted in an opening in the vertical flange plate 389 as indicated at 439. The other end of the cylinder is closed by a head 441, ported at 443. A piston 445 is horizontally slidable in the cylinder and is linked to the lever 421 by a bead chain 447. A pipe line 449 connects port 443 into the vacuum system of the record player. Upon evacuating the cylinder 437 through port 443 and line 449, atmospheric pressure in the open end of the cylinder drives the piston toward the head 441 to swing lever 421 clockwise, as viewed from above, thereby to swing the lever against the pin 423 and swing the tone arm counterclockwise as viewed from above to its retracted position. When the cylinder 437 is vented to atmosphere through port 443 and line 449, spring 427 returns the lever 421 to retracted position.

The cylinder 437 of motor 435 is of smaller diameter than the cylinder 347 of motor 345. Both of these are coupled into the same line 763 (Fig. 41) in the vacuum system through lines 449 and 361 as will be made clear. The result is that there is a differential action due to the difference in diameters of these cylinders so that the tone arm is lifted up before it is swung out upon evacuating the line 763 and, conversely, is swung in before it is lowered upon venting the line 763.

The record-changing cycle of the record player is automatically initiated at the termination of the playing of a side of a record by the closure of a tone-arm controlled switch 451 (Figs. 13, 17, 21 and 42). This switch is mounted above the base plate 297 and has a horizontally swinging operating lever 453 engageable by a pin 455 extending downward from the rearward end of the tone arm at the termination of the playing of the side of the record to close the switch. It will be understood that the tone arm swings relatively slowly clockwise as viewed from the top as a record is played until its needle enters the usual terminating spiral portion of the groove in the record, whereupon the tone arm is quickly swung inward. As the tone arm is thus quickly swung inward, pin 455 rotates lever 453 counterclockwise as viewed from above to close the switch. The switch is mounted on the base plate 297 for swinging adjustment about a vertical axis so that it may be readily accurately positioned for closure at the termination of the playing of a side of a record. For this purpose it is fixed upon a bracket 457 carried by a vertical stem 459 which is frictionally rotary in the base plate 297 at 461.

Figure 2:
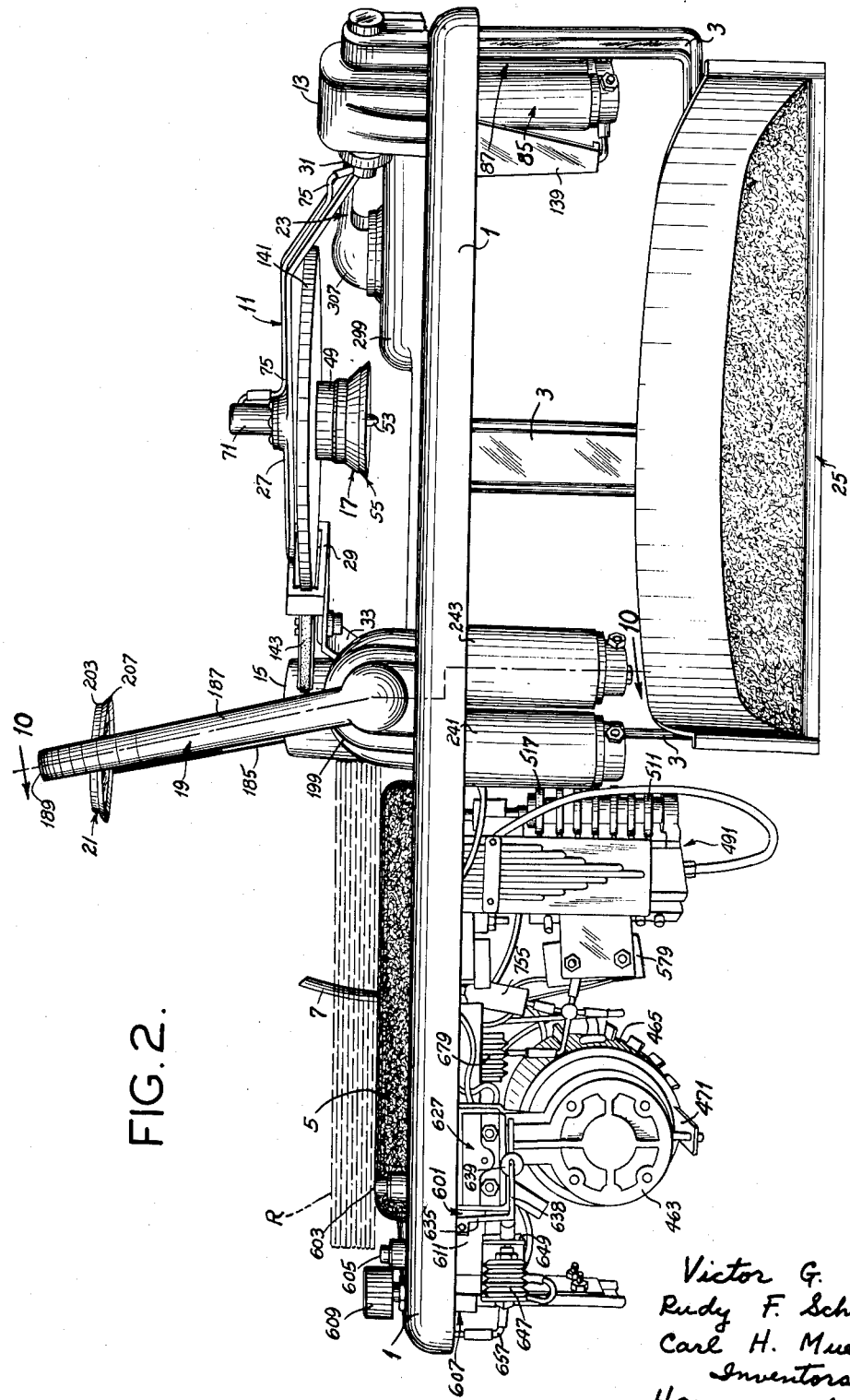
Fig. 2 (Sheet 2) is a perspective front elevation of Fig. 1.

The vacuum system of the record player comprises a rotary vacuum pump 463 driven by an electric motor 465 (Figs. 2–4). The latter is mounted under the table adjacent its left side (Fig. 4). The pump comprises a cylinder 469 retained against rotation by brackets 471 extending from the casing of the motor. It has an eccentric rotor 473 (Figs. 22–23) working in its cylindric pump chamber 475 and fixed on the shaft 477 of the motor. An abutment 479 is radially slidable in a recess 481 in a boss 483 on the pump cylinder and is biased against the periphery of the rotor by a spring 485. On one side of the abutment is an inlet or vacuum port 487 and on its other side is an exhaust port 489. The motor 465 drives the rotor counterclockwise as viewed in Fig. 22 to draw a vacuum in vacuum port 487, exhausting to the atmosphere through port 489.

An assembly of cam-operated valves for controlling the operation of the vacuum-operated mechanisms previously described is generally designated 491 (Figs. 2, 3, 24 and 25). This comprises an open rectangular frame 493 mounted to extend downward under the table 1 to the left of the aperture 9 in the table. The frame has generally vertical side members 495 and 497 and upper and lower members 499 and 501. Arms 503 and 505 extend generally horizontally from the upper and lower ends of the side 495 of the frame. A cam shaft 507 is journalled for rotation on a generally vertical axis in these arms. Seven cams, designated 511, 512, 513, 514, 515, 516 and 517 in order from the lowermost cam upward, are fixed on the cam shaft between the arms at equally spaced axial intervals. These cams operate D-valves 521, 522, 523, 524, 525, 526 and 527, respectively, the valves being mounted for sliding movement in guide apertures in the sides 495 and 497 of the frame, and being biased into engagement with the cams by springs 529.

The D-valves slide horizontally across the inside face 530 of a valve block 531 (Figs. 25–29), having substantially air-tight sealing engagement with the block. The latter is secured to the frame 493 as indicated at screws 533. It is provided with a bore 535 (Figs. 25 and 27) extending upward from its lower end constituting a vacuum manifold. The manifold 535 is connected by a line 537 directly to the vacuum port 487 of the vacuum pump 463. Whenever the latter is operating, a vacuum is drawn in the manifold. The manifold extends upward as far as the sixth valve 526, but does not reach as far as the uppermost valve 527. Ports 541, 542, 543, 544, 545 and 546 lead from the manifold 535 to the inside face 530 of the valve block 531 in association with D-valves 521, 522, 523, 524, 525 and 526, respectively. These ports are aligned in a vertical plane. A port 547 extends completely through the valve block from its inside face to its outside face in this same plane in association with the uppermost valve 527. Transfer ports 551, 552, 553, 554, 555 and 556 (Figs. 26 and 28) extend completely through the valve block from its inside face to its outside face in a vertical plane parallel to the plane of the manifold ports and in association with valves 521, 522, 523, 524, 525 and 526, respectively. Corresponding manifold and transfer ports are at the same level, i. e., port 541 is at the same level as port 551, port 542 is at the same level as port 552, etc. Associated with the sixth valve 526 in addition to ports 546 and 556, is a port 566 (Figs. 26 and 29) which extends completely through the valve block at the level of ports 546 and 556 and on the opposite side of port 546 from port 556. Associated with the seventh valve 527 is a port 557 (Figs. 26 and 27) which extends completely through the valve block at the level of port 547 and in the vertical plane of the transfer ports.

The D-valves 521, 522, 523, 524 and 525 are controlled by the respective cams 511, 512, 513, 514 and 515 for movement between a position away from the cam centers wherein transfer ports 551, 552, 553, 554 and 555 are in communication through the valves with manifold ports 541, 542, 543, 544 and 545, and a position toward the cam centers wherein the transfer ports are open to the atmosphere at their inner ends openings through the inside face 530 of the valve block and the manifold ports are sealed off by the valves to hold vacuum in the manifold. Fig. 30 illustrates valve 521 in the first of these positions and Fig. 25 illustrates the valve in the second. The D-valve 526 is controlled by its cam 516 for movement between an outer position away from the cam center wherein transfer port 556 is in communication through the valve with manifold port 546 and port 566 is open to atmosphere, an intermediate position wherein port 566 is open to atmosphere with transfer port 556 blocked from port 546, and an inner position toward the cam center wherein the transfer port 556 is open to atmosphere at its inner end and the manifold port 546 is in communication through the valve with port 566. The D-valve 527 is controlled by its cam 517 for movement between a position away from the cam center wherein ports 547 and 557 are in communication through the valve and a position toward the cam center wherein port 557 is open to atmosphere at its inner end and port 547 is blocked at its inner end by the valve.

The cam shaft 507 is driven by an electric motor 571 through a speed reducing gear train generally designated 573 (Fig. 3). The motor and gear train are mounted under the table 1. The motor is under the control of a cam-operated switch 579 (Figs. 2, 24 and 25). This switch is mounted in generally upright position on a bracket 581 fastened to the valve block 531. It has a spring operating arm 583 biased to open the switch. This arm is inclined for engagement of its lower end by the rearward end of the lowermost D-valve 521. When this valve is in its position away from the cam center, it holds the arm against its bias in switch-closing position. When the valve is in its position toward the cam center, the arm is released and in switch-opening position.

The operation of the record player is controlled by a primary control mechanism generally designated 601 and including an "On" and "Reject" push button 603 and an "Off" push button 605, and by a cycle selector mechanism generally designated 607 operated by a rotary selector knob 609 (Figs. 1-4). Push button 603 is operated either to start the operation of the record player or to reject a record. Push button 605 is operated to stop the record player. Knob 609 may be rotated to one or the other of two positions to set the record player either to play both sides of records or single sides. The mechanisms 601 and 607 are mounted under the table 1 adjacent its left front corner, and the push buttons and selector knob are accessible from above the table.

As shown more particularly in Figs. 31-33, the primary control mechanism 601 comprises a vertical bracket plate 611 having an upper horizontal flange 613 by means of which it is fixed to the bottom of the table to extend generally parallel to and adjacent the forward edge of the table. Mounted on the bracket plate 611 is a reject switch 615 comprising a pair of spring arms 617 and 619 extending horizontally from a block of insulation 621 and having opposed contacts 623 at their free ends. This switch is normally open. It is adapted to be closed by the push button 603. The latter is vertically slidable in an aperture in the table 1 and has a stem 625, the inner end of which is in engagement with the free end of the spring arm 617.

A main switch 627 is also mounted on the bracket plate 611. This switch has a switch-closing operating button or stem 629 projecting up from the top of its case 631 in line with the push button stem 625 and a switch-opening button or stem 633 projecting down from the bottom of case 631. The contact-carrying free ends of the spring arms 617 and 619 of the reject switch 615 extend between the opposed ends of stems 625 and 629. Thus, when push button 603 is pushed downward, stem 625 first closes the reject switch at contacts 623, then acting through the spring arms 617 and 619, pushes down stem 629 to close the main switch 627. This also drives the switch-opening stem 633 of the main switch downward.

At 635 is shown a lever for driving switch-opening stem 633 upward to open the main switch 627. This lever is pivoted at 637 on the bracket plate 611 for rocking movement about a horizontal axis. At its lower end it has a horizontal extension 638 which reaches under the main switch 627 and carries a roller 639 engageable with stem 633. At its upper end the lever has an arm 641 reaching under the push button 603 for engagement by a downwardly facing shoulder 643 on the push button stem 625 and an arm 645 reaching under the lower end of the "Off" push button 605. The arrangement is such that when the push button 603 is pushed downward, the lever 635 is rocked clockwise as viewed in Fig. 31 about its pivot 637. This moves roller 639 downward away from switch-opening stem 633 to permit this stem to move downward. When the "Off" push button 605 is pushed downward, the lever 635 is rocked counterclockwise. This moves roller 639 upward to drive stem 633 upward to open the main switch 627.

The lever 635 is actuable by a bellows 647 automatically to open the main switch 627 in a manner that will be described. The bellows is mounted in a U-shaped bracket 649 secured to the plate 611 at the left of the lever 635 as viewed in Figs. 31-33, with its axis of expansion and contraction extending generally horizontally. The outer end of the bellows is fixed to the outer arm of the U-shaped bracket 649 by a hollow bolt 651, the passage through the bolt constituting a bellows port 653. The inner end of the bellows is free to move toward and away from the lever 635 and has a rod 655 extending slidably through a guide 658 in the inner arm of bracket 649 engaging the lever 635 at a point below the pivot 637. A line 657 connects the bellows port 653 to the vacuum system of the record player. As long as a vacuum is held in the bellows, atmospheric pressure maintains it collapsed to hold the rod 655 in a retracted position. When the vacuum in the bellows is lost, the bellows expands, thereby moving the rod 655 to the right as viewed in Fig. 31, and rocking lever 635 counterclockwise to open the main switch 627.

As shown more particularly in Figs. 34-37, the cycle selector mechanism comprises a vertical bracket plate 661 having an upper horizontal flange 663 by means of which it is fixed to the bottom of the table. A valve 665 is mounted on this plate. The valve comprises a valve block 667 fixed to one side of the plate, and a rotary valve disc 669. The latter is mounted for rotation by means of a stem 671 extending axially through the valve block.

A compression spring 673 reacting from the valve block against a shoulder 675 on the stem biases the valve disc against the block to provide for rotary sealing engagement between the contacting end faces of the disc and block at 677. The valve disc 669 is rotated by a bellows 679. The latter is mounted in a U-shaped bracket 681 secured to the plate 661 at the right of the valve 665 as viewed in Figs. 34 and 35, with its axis of expansion and contraction extending generally horizontally. The outer end of the bellows is fixed to the outer arm of the U-shaped bracket 681 by a hollow bolt 683, the passage through the bolt constituting a bellows port 685. The inner end of the bellows is free to move toward and away from the valve 665 and has a rod 687 extending slidably through a guide 689 in the inner arm of bracket 681. The stem is coupled to a radial arm 691 of the rotary valve disc by a link 693.

When the bellows 679 is expanded, the valve disc is in a first limiting position, which is its position for playing double sides, as determined by engagement of the radial arm 691 with a stop 695 extending from the valve block 667. A line 697 connects bellows port 685 to the vacuum system of the record player. The bellows is contracted by drawing a vacuum therein through port 685 and line 697. This pulls the rod 687 to the right as viewed in Fig. 35 and rotates the valve disc 669 clockwise to a second limiting position, which is its position for playing single sides. This action also closes a switch generally designated 699. This switch comprises an arm 701 fixed to and extending outward from the rotary valve disc 669. At the outer end of this arm is a terminal 703 held on the arm by a bolt and nut. The head of the bolt constitutes a contact 705. A bracket 707 fixed at 709 to the plate 661 carries a terminal 711 held on the bracket by a bolt and nut, the head of the bolt constituting a contact 713 engageable by contact 705 not only to close the switch but also to limit clockwise rotation of the valve disc and determine its second limiting or single side playing position.

The valve block is formed with four valve ports 715, 717, 719 and 721 extending from the end face of the block at 677 to the other end face of the block and opening into apertures in the bracket plate 661. Ports 715 and 717 are diametrically opposed and are aligned with ports 725 and 723 in the rotary valve disc 669 when the latter is in its double side playing position determined by engagement of arm 691 with stop 695. Ports 719 and 721 are also diametrically opposed and angularly related in respect to ports 715 and 717 for alignment with ports 723 and 725 when the rotary valve disc is in its single side playing position.

The selector knob 609 operates a selector valve 727 mounted beneath the table under the knob. As shown in Fig. 38 the selector valve comprises a housing 728 fixed at its upper end in an aperture in the table as indicated at 729. A plug 730 is threaded in the lower end of the housing and closes it. Extending vertically through the plug are two diametrically opposed ports 731 and 733. The knob 609 is fixed on the upper end of a valve stem 734 which extends through and is rotary in the upper end of the housing 728. A valve disc 735 is keyed to the lower end of the valve stem for rotation therewith, and for axial movement relative to the valve stem. A compression spring 736 reacting from the stem against the disc biases the latter into engagement with the upper face of the plug. In the disc are two ports 737 and 738, which are in communication through a passage 739 in the disc. The latter has a flat, as indicated at 740. The knob 609 and the disc 735 are rotary between a double side playing position and a single side playing position, spaced 90°, and determined by engagement of the flat with a stop pin 741 extending upward from the plug. When the knob is turned to set the record player for playing double sides, the disc is rotated to its double side playing position illustrated in Fig. 39 wherein port 731 is blocked and port 733 is open to atmosphere into the housing 728 alongside the flat and through a vent 742 in the housing. This position is indicated by a pointer 743 on the knob and a "Double" indication 744 on the table. When the knob is turned to set the record player for playing single sides, the disc is rotated to its single side playing position illustrated in Fig. 40 wherein ports 731 and 733 are in communication through port 737, passage 739 and port 738. This position is indicated by the pointer 743 and a "Single" indication 745 on the table.

As shown diagrammatically in Fig. 41, the suction line 537 connects the suction port 487 of the vacuum pump 463 and the manifold 535 in the valve block 531. A vacuum reservoir 751 is connected into the suction line 537 by a line 753 including a check valve 755. This valve is of suitable construction for holding vacuum in the reservoir when the vacuum pump is not in operation. The reservoir comprises a metal tank fixed beneath the table by a strap 757. The line 657 from the bellows 647 of the primary control mechanism 601 is connected into the reservoir line 753 at a point between the reservoir and the check valve. A line 759 leads from the reservoir line 753 from a point between the check valve and reservoir to the port 547 in the valve block 531.

A line 761 connects the port 551 in the valve block 531 and the port 717 in the fixed valve block 667 of valve 665. A line 763 leads from the port 723 in the rotary disc 669 of valve 665 to the stem of a Y-coupling 765. Line 763 is flexible, at least adjacent the rotary disc 669, to permit the disc to rotate. The line 361 connected to port 353 in the cylinder 347 of the tone arm lifting vacuum motor 345 leads to one branch of the Y-coupling, and the line 449 connected to port 443 in the cylinder 437 of the tone arm return vacuum motor 435 leads to the other branch of the Y-coupling. The line 265 connected to port 251 in the cylinder 245 of the record transfer arm vacuum motor 241 leads to port 552 of the valve block 531. The line 239 connected to the vacuum-grip record lifter 21 leads to the port 553. A line 767 leads from port 554 to the port 715 in the fixed valve block of valve 665. Line 409 connected to port 401 in the cylinder 395 of the tone arm pusher lever vacuum motor 393 leads to the port 725 in the rotary disc 669 of valve 665. The line 267 connected to port 261 in the cylinder 255 of the record transfer arm vacuum motor 243 leads to the port 555. The line 111 connected to the port 95 in cylinder 89 of vacuum motor 85 leads to the port 556. The line 113 connected to the port 105 in cylinder 99 of motor 87 leads to the port 566. The line 83 connected to the turntable suction pad leads to the port 557. Port 731 of the selector valve 727 is connected to line 113 by a line 769. The other port 733 of the selector valve is connected by the line 697 to the bellows 679. A line 771 connects line 697 and the port 719 in the valve block 667 of valve 665. The port 721 in the valve block 667 is a vent, open to atmosphere.

The electrical system of the record player is diagrammatically illustrated in Fig. 42. At L is shown a two-wire power supply cord having a plug P for plugging into an electrical outlet. One wire 801 of the cord is connected to one terminal 803 of the main switch 627. The other wire 805 of the cord is connected to a terminal 807 of a relay 809. The latter is mounted underneath the table. A wire 811 connects the other terminal 813 of the main switch and a terminal of the turntable motor 173. A wire 815 connects relay terminal 807 and the other terminal of the motor 173. Whenever the main switch 627 is closed, the turntable motor circuit is completed through wire 801, switch 627, wire 811, the motor 173, wire 815 and wire 805.

A wire 817 connects terminal 803 of the main switch 627 and one terminal 819 of the cam-operated switch 579. A wire 821 connects terminal 819 of the cam-operated switch to one terminal 823 of the cam shaft motor 571. A wire 825 connects terminal 823 and one terminal of the vacuum pump driving motor 465. The latter is a capacitor start motor and has a capacitor 827 mounted underneath the table. A wire 829 connects the other terminal of motor 465 and the other terminal 831 of cam shaft motor 571. A wire 833 connects terminal 831 and a terminal 835 of the relay 809. The latter includes a switch 837 adapted to make and break a circuit between relay terminals 807 and 835, and a relay coil 839 connected between terminal 807 and a third relay terminal 841. A wire 843 connects relay terminal 841 and one terminal 845 of the reject switch 615. A wire 847 connects terminal 845 and the second terminal 849 of the cam-operated switch 579.

A wire 851 connects terminal 845 of the reject switch 615 and one terminal of the tone arm controlled switch 451. A wire 853 connects the other terminal of switch 451 and the other terminal 855 of the reject switch 615. A wire 857 connects terminal 813 of the main switch 627 and terminal 855 of the reject switch 615. A wire 859 connects wire 857 and terminal 703 of the single and double side switch 699. A wire 861 connects the other terminal 711 of switch 699 and terminal 845 of the reject switch 615.

Figure 43:
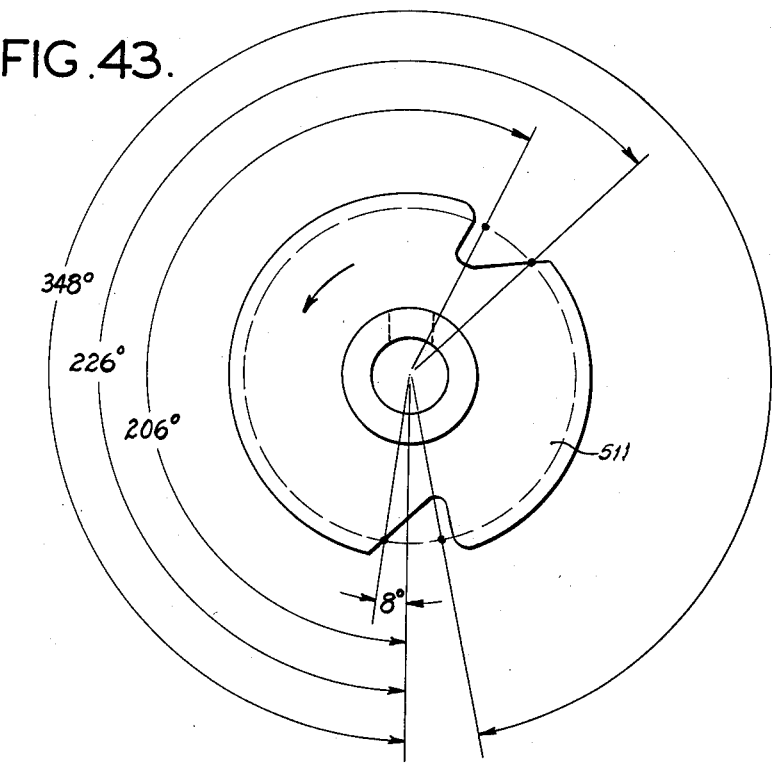
Figs. 43–49 (Sheets 14 and 15) are views illustrating the development of the cams controlling the operation of the record player.
Figure 44:
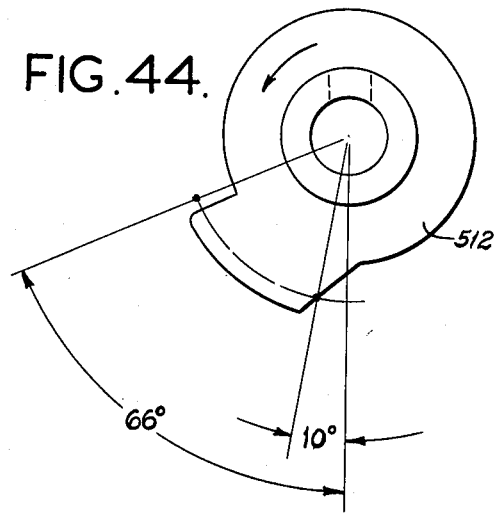
Figure 45:
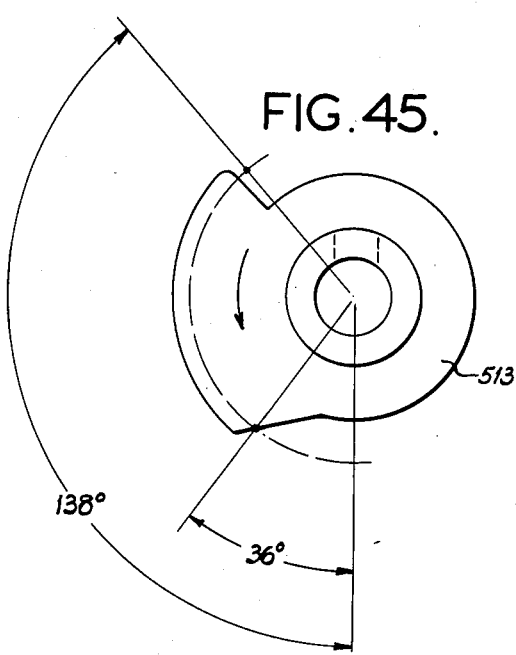
Figure 46:
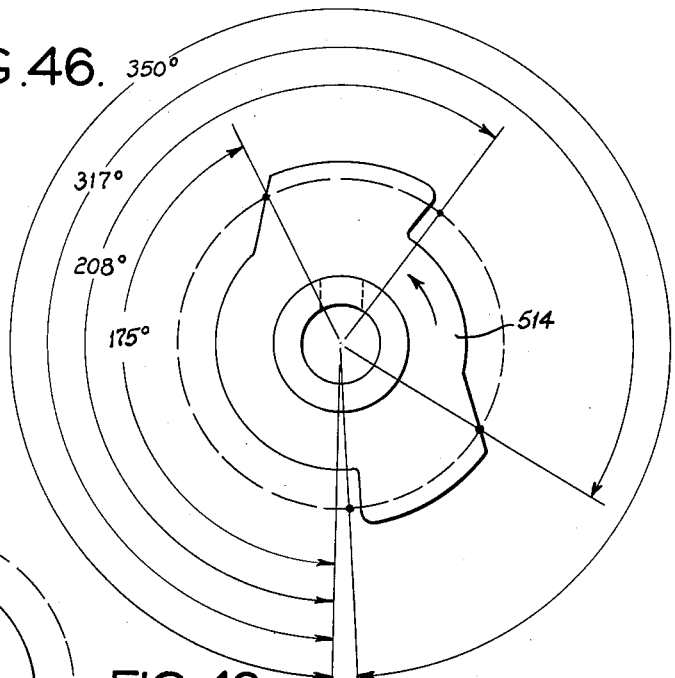
Figure 47:
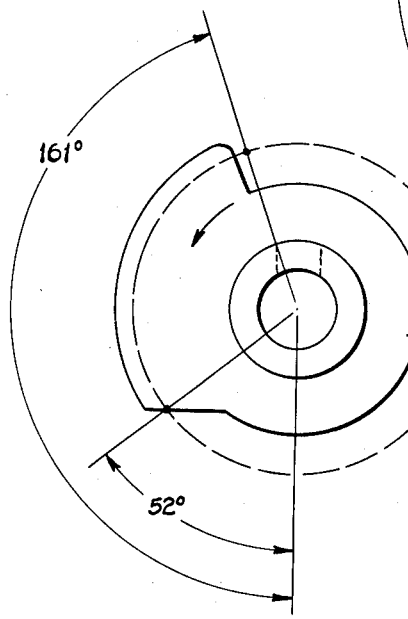
Figure 48:
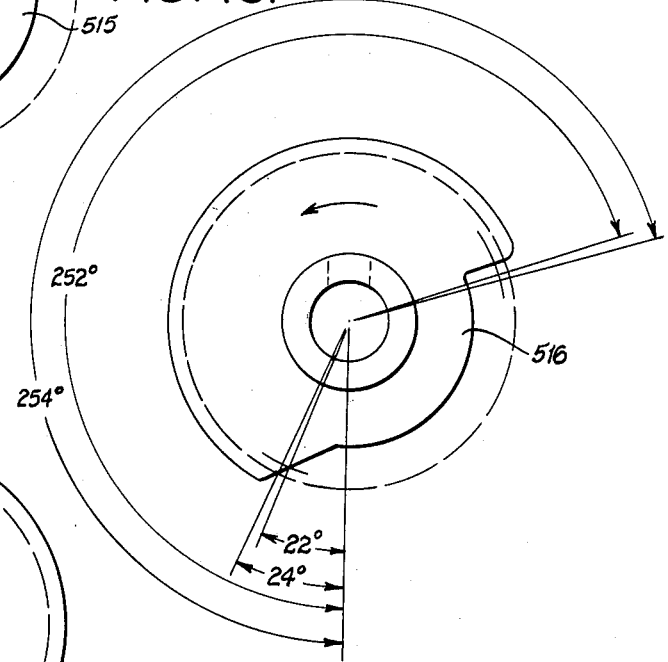
Figure 49:
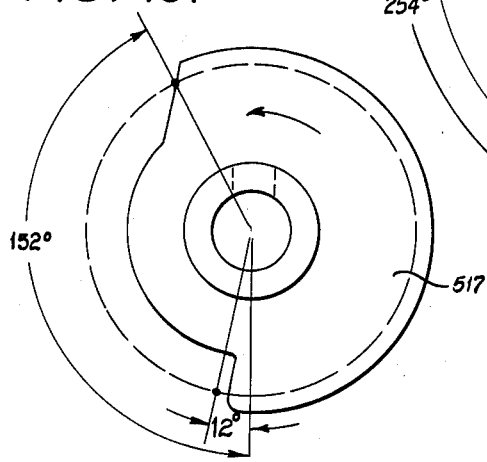

The cam shaft 507 is driven by the cam shaft motor 571 through one revolution during each complete record changing cycle in a manner that will be made clear in the detailed description of the operation of the record player to follow. This rotates the cams 511, 512, 513, 514, 515, 516 and 517 counterclockwise from their initial or 0° positions illustrated in Figs. 43–49 through 360° and back to their initial positions. Cam 511 (Fig. 43) is so developed and phased that with the cam in its 0° position the associated valve 521 is in closed or venting position, i. e., the manifold port 541 of the valve is closed off from the transfer port 551 of the valve, and the latter port is open to atmosphere. With the valve 521 in venting position, switch 579 is open. When the cam 511 rotates counterclockwise through 8° from its 0° position, it moves the valve 521 to open position, i. e., it drives the valve away from the cam center to the position wherein the transfer port 551 is in open communication with manifold port 541 through the valve. This closes switch 579. The valve 521 remains open until the cam 511 has rotated through 206° from its 0° position, whereupon the valve closes. The cam and the cam follower portion of the valve are so shaped that the switch opens shortly after the valve closes. At 226° from 0° position, the valve reopens and the switch re-closes and so remain until the cam has rotated through 348° from its 0° position, whereupon the valve again closes. The switch opens shortly after the valve closes.

The cam 512 (Fig. 44) is so developed and phased that with the cam in its 0° position the associated valve 522 is in closed or venting position. At 10° from 0° position the cam opens the valve and holds its open until the cam has rotated through 66° from 0° position. Thereupon the valve 522 closes and remains closed for the remainder of the revolution.

The cam 513 (Fig. 45) is so developed and phased that with the cam in its 0° position the associated valve 523 is in closed or venting position. At 36° from 0° position the cam opens the valve and holds it open until the cam has rotated through 138° from 0° position. Thereupon the valve 523 closes and remains closed for the remainder of the revolution.

The cam 514 (Fig. 46) is so developed and phased that with the cam in its 0° position the associated valve 524 in closed or venting position. At 175° from 0° position, the cam opens the valve and holds it open until the cam has rotated through 208° from 0° position, whereupon the valve re-closes. The valve remains closed until the cam has rotated through 317° from 0° position whereupon, the cam again opens the valve. It holds the valve open until it has rotated through 350° from 0° position, whereupon the valve closes and remains closed for the remainder of the revolution.

The cam 515 (Fig. 47) is so developed and phased that with the cam in its 0° position the associated valve 525 is in closed or venting position. At 52° from 0° position, the cam opens the valve and holds it open until the cam has rotated through 161° from 0° position. Thereupon the valve 525 closes and remains closed for the remainder of the revolution.

The cam 516 (Fig. 48) is so developed and phased that with the cam in its 0° position the associated valve 526 is in its innermost position with respect to the cam center wherein the transfer port 556 is open to atmosphere and the manifold port 546 is in communication through the valve with the port 566. At 22° from 0° position, the cam has moved the valve away from the cam center to its intermediate position wherein port 566 is blocked off from port 546 and is open to atmosphere, transfer port 556 being blocked off from port 546. At 24° from 0° position, the cam has moved the valve further away from the cam center to its outermost position wherein manifold port 546 is in communication through the valve with transfer port 556, and port 566 is fully open to atmosphere. The cam holds the valve in this outermost position until it has rotated through 252° from its 0° position, whereupon the valve moves back toward the cam center to its intermediate position. At 254° from 0° position, the cam is in such position that the valve returns to its initial position and remains there during the remainder of the revolution.

The cam 517 (Fig. 49) is so developed and phased that with the cam in its 0° position the associated valve 527 is in an initial outermost open position with respect to the cam center wherein ports 547 and 557 are in communication through the valve. At 12° from 0° position, the cam is in such position that the valve moves inward toward the cam center to its inner closed position wherein port 557 is open to atmosphere and port 547 is blocked. The valve remains in this closed position until the cam has rotated through 152° from 0° position, whereupon the valve is opened and remains open for the remainder of the cycle.

The operation of the record player when set to play double sides will be described in a series of numbered steps following the sequence of operation of the valves 521 to 527 as the valve-actuating cams 511 to 517 rotate through 360° from the 0° position. As will appear, the cam shaft 507 and the cams 511 to 517 are in the 0° position when the turntable 17 is inverted and a record gripped by the turntable is being played. To set the record player to play double sides, the selector knob 609 is turned to the position where the pointer 743 on the knob points to the "Double" indication 744. This sets the selector valve disc 735 to block the port 731 and open the port 733 to atmosphere. This vents the bellows 679, which thus remains expanded so that the rotary valve disc 669 of the valve 665 remains in the position illustrated in Figs. 35 and 37. Under these circumstances, the switch 699 controlled by the valve 665 remains open. It is assumed that a stack of records has been placed on the record supply platform 5, centered on pin 7. The records may be of intermixed sizes, if desired.

When a record gripped by the inverted turntable is being played, the main switch 627 is closed. With this switch closed, a circuit is completed through wire 801, switch 627, wire 811, the turntable driving motor 173, wire 815 and wire 805. The turntable driving motor is thus energized to drive the turntable. With the turntable inverted, and the turntable cradle in its corresponding up position, this drive is established through gears 179 and 165, shaft 160, and gears 161, 143 and 141. This drives the turntable clockwise as viewed from above.

With the cam shaft 507 and cams 511 to 517 in 0° position, valve 521, controlled by cam 511, is in closed position and the switch 579 controlled by valve 521 is open. With switch 579 open, the cam shaft motor 571 and the vacuum pump driving motor 465 are deenergized. Consequently the vacuum pump 463 is out of operation. With valve 521 closed, the associated transfer port 551 is open to atmosphere. Under these circumstances, the vacuum motors 435 and 435 are vented to atmosphere through lines 361 and 499, Y-coupling 765, line 763, ports 723 and 717 of valve 665, line 761 and open port 551. With motor 345 vented, the spring 337 holds the tone arm lifting lever 327 down so that the tone arm is lowered for playing the record. The piston 355 of motor 345 is accordingly raised. With motor 435 vented, the torsion spring 427 holds the tone arm return lever 421 in its retracted position of Figs. 14, 15 and 17. The piston 445 of motor 435 is pulled out toward the open end of the cylinder 437 of the motor.

With the cam 512 in 0° position, the valve 522 controlled thereby is closed, so that the associated transfer port 552 is open to atmosphere. Accordingly, motor 241 is vented through line 265 and the open port 552. With the cam 515 in 0° position, the valve 525 controlled thereby is closed so that the associated transfer port 555 is open to atmosphere. Accordingly, motor 243 is vented through line 267 and the open port 555. With motors 241 and 343 both vented, the record transfer arm 19 is maintained in the neutral position illustrated in Figs. 1, 2, 4 and 10 by the action of the transfer arm spring counterbalance mechanism 277.

With the cam 513 in 0° position, the valve 523 controlled thereby is closed, so that the associated transfer port 553 is open to atmosphere, and the line 239 connecting this port and the record lifter suction pad 207 is open at both ends. With the cam 514 in 0° position, the valve 524 is closed, so that the associated transfer port 554 is open to atmosphere. The motor 393 is accordingly vented through line 409, ports 725 and 715 of valve 665, line 767 and open port 554. With motor 393 vented the spring 383 holds the tone arm pusher lever 365 in its retracted position illustrated in Figs. 1, 14 and 15. The piston 403 of motor 393 is pulled out toward the open end of the cylinder 395 of the motor.

With the cam 516 in its 0° position, the valve 526 is in its inner position wherein the associated transfer port 556 is open to atmosphere and ports 546 and 566 are in communication through the valve. The motor 85 is accordingly vented through line 111 and open port 556. The motor 87 is connected through line 113, port 566, the valve 526 and port 546 to the vacuum manifold 535 in valve block 531, but there is no vacuum in the manifold since pump 463 is out of operation. Since the turntable cradle 11 is in its up position and the turntable 17 is inverted, the piston 93 of motor 85 is up and the piston 103 of motor 87 is down (Fig. 7). The cradle is retained in its up position by the action of the over-centering mechanism 126.

With the cam 517 in its 0° position, the valve 527 is open so that ports 547 and 557 are in communication through the valve. A vacuum is accordingly drawn in the turntable suction pad 55 through line 83, port 557, the valve 527, port 547 and line 759, the latter being connected to the vacuum reservoir 751. This vacuum holds the record on the inverted turntable. It will be noted that this vacuum develops from the vacuum reservoir, not from the pump 463, which is not operating. The reservoir is provided to maintain a source of vacuum sufficient to hold a record on the inverted turntable while the record is being played, since during the playing interval the pump 463 is stopped. The pump is of sufficient capacity to build up sufficient vacuum in the reservoir for this purpose during the interval for which it operates between playings. The vacuum in the reservoir also holds the bellows 647 collapsed so that the main swtich 627 remains closed.

As the record on the inverted turntable is played, the tone arm 23 swings inward toward the center of the record by reason of the tracking action of the needle in the playing groove in the record. When the needle enters the terminating spiral of the playing groove, the pin 455 closes the tone arm controlled switch 451. This institutes rotation of the cam shaft 507 and the cams 511—517 counterclockwise as viewed in Figs. 43–49 and also institutes operation of the vacuum pump 463, as follows:

With switches 451 and 627 closed, a circuit is completed from terminal 813 of switch 627 through wire 857, wire 853, switch 451, wire 851, wire 843 and relay coil 839 to relay terminal 807. This closes the relay switch 837 and completes a circuit from terminal 803 of switch 627 through wire 817, terminal 819 of switch 579 (which is now open) wire 821, terminal 823 of cam shaft motor 571, the motor 571, its other terminal 831, wire 833, and switch 837 to terminal 807. This energizes motor 571 to drive the cam shaft. The vacuum pump driving motor 465 is also energized through wires 825 and 829 from terminals 823 and 831, and drives the pump 463. This draws a vacuum in manifold 535 through suction line 537. It evacuates the reservoir 751 through line 753 and check valve 755.

As the cams rotate counterclockwise from their 0° positions as viewed in Figs. 43–49, record changing steps occur in the following sequence:

*Step 1*

At 8°, cam 511 opens valves 521 and closes switch 579. With valve 521 open, communication is established from transfer port 551 through the valve and manifold port 541 to the vacuum manifold 535. The latter is evacuated, since pump 463 is operating. Accordingly, vacuums are drawn in motors 345 and 435 through lines 361 and 449, Y-coupling 765, line 763, ports 723 and 717 of valves 665, line 761, port 551, the valve 521 and port 541. With a vacuum drawn in motor 345, the piston 355 of this motor is moved downward to raise the tone arm to lift the needle out of the record groove. With a vacuum drawn in motor 435, the piston 445 of this motor is retracted to rock the tone arm return lever 421 clockwise as viewed in Fig. 17 thereby to swing the tone arm outward to retracted position clear of the aperture 9 in the table. When the tone arm swings outward to retracted position, tone arm switch 451 opens. With cam-operated switch 579 closed, however, a holding circuit for the relay is established from terminal 803 of main switch 627 through wire 817, switch 579, wire 847, wire 843, and relay coil 839 to terminal 807. This holds the relay switch 837 closed to maintain the cam shaft motor 571 and the pump driving motor 465 energized.

*Step 2*

At 10°, cam 512 opens the valve 522. With this valve open, communication is established from transfer port 552 through the valve and manifold port 542 to the vacuum manifold 535. Accordingly, a vacuum is drawn in motor 241 through line 265, port 552, the valve 522 and port 542. At 10°, the valve 525 is still closed. Consequently, motor 243 is vented through line 267 and the open valve transfer port 555. With a vacuum drawn in motor 241 and motor 243 vented, the piston 249 of motor 241 is moved downward, pulling the piston 259 of motor 243 upward. This swings the record transfer arm 19 counterclockwise as viewed in Fig. 2 toward the stack of records on platform 5 until the vacuum-grip record lifter 21 engages the top record of the stack, the suction pad 207 of the record lifter being pressed against the upper face of the top record.

*Step 3*

At 12°, cam 517 closes the valve 527, opening the transfer port 557 to atmosphere. This vents the turntable suction pad 55 through line 83 and open port 557. This releases the played record from the inverted turntable and the record drops flatwise into the record receiver 25, cushioned by the air between the record and the receiver to check its fall and prevent it from breaking.

Step 4

At 22°, cam 516 moves the valve 526 to its intermediate opsition wherein the port 566 is open to atmosphere. This vents the motor 87 through line 113 and the open port 566.

Step 5

At 24°, cam 516 moves the valve 526 to its outer position wherein the transfer port 556 is in communication through the valve with the manifold port 546 and vacuum manifold 535. This draws a vacuum in motor 85 through line 111, port 556, the valve and port 546. With motor 87 vented (Step 4) and a vacuum drawn in motor 85, the piston 93 of motor 85 is moved downward and pulls the piston 103 of motor 87 upward. This swings the turntable cradle 11 down to swing the turntable 17 to upright position. The overcentering mechanism 126 overcenters to hold the cradle down and the turntable upright. When the cradle 11 is swung down, gear 143 meshes with gear 163, and the turntable is driven clockwise as viewed from above.

Step 6

At 36°, cam 513 moves the valve 523 to open position, establishing communication from the transfer port 553 through the valve to the manifold port 543 and the vacuum manifold 535. Consequently, a vacuum is drawn in the suction pad 207 of the vacuum-grip record lifter 21 through line 239, port 553, the valve 523 and port 543. Since the suction pad is pressed against the upper face of the top record of the supply stack, it grips the record.

Step 7

At 52°, the cam 515 moves the valve 525 to open position, establishing communication from the transfer port 555 through the valve to the manifold port 545 and the vacuum manifold 535. Consequently, a vacuum is drawn in motor 243 through line 267, port 555, the valve, and port 545. The piston 259 of motor 243 is then subjected to the differetnial pressure of the atmosphere above it and the vacuum in the cylinder 255 below it, and tends to move downward, but is prevented from moving downward since there is vacuum in cylinder 245 of motor 241 tending to cause downward movement of the piston 249 in cylinder 245.

Step 8

At 66°, the valve 522 moves to closed position under the control of cam 512. This opens the transfer port 552 to atmosphere. Consequently, the cylinder 245 of motor 241 vents through the cylinder port 251, line 265 and port 552. With cylinder 245 vented, the piston 259 is free to move downward and does so. This swings the record transfer arm 19 clockwise as viewed in Fig. 2 from its position over the stack of records to its position over the turntable (which is now upright). The vacuum-grip record lifter 21 picks up the uppermost record and conveys it to a position over the turntable centered on the turntable record-centering pin 53.

Step 9

At 138°, the valve 523 moves to closed position under the control of cam 513. This opens port 553 to atmosphere. Consequently, the vacuum in the record lifter suction pad 207 is lost, the suction pad venting through the line 239 and port 553. The grip of the suction pad on the transferred record is thus released, and the record drops on to the turntable.

Step 10

At 152°, the cam 517 moves the valve 527 to open position. This establishes communication from port 557 through the valve to port 547. Consequently a vacuum is drawn in the turntable suction pad 55 through line 83, port 557, the valve, port 547 and line 759, the latter being connected into the vacuum reservoir 751 through line 753. With a vacuum established in the turntable suction pad, the transferred record, released from the vacuum-grip record lifter, is gripped by and rotates with the turntable.

Step 11

At 161°, the valve 525 under control of cam 515 moves to its closed position wherein port 555 is open to atmosphere. This vents the cylinder 255 of vacuum motor 243 through the cylinder port 261, line 267 and port 555. The cylinder 245 of vacuum motor 241 is also vented at this time, valve 522 having been closed at 66° by the action of cam 512 (Step 8). Thereupon, the record transfer arm 19 swings to its neutral position of Fig. 2 under the action of the transfer arm spring counterbalance mechanism 277.

Step 12

At 175°, the cam 514 opens the valve 524. This establishes communication from transfer port 554 through the valve to the manifold port 544 and the vacuum manifold 535. This draws a vacuum in the cylinder 395 of the tone arm pusher lever vacuum motor 393 through the cylinder port 401, line 409, ports 725 and 715 of valve 665, line 767, port 554, valve 524 and port 544. Thereupon, the piston 403 of motor 393 is retracted and swings the tone arm pusher lever 365 inward toward the record on the turntable. Pad 415 on the lever engages the tone arm 23 and swings it inward. The tone arm is in its raised position, valve 521 having been opened at 8° by cam 511 (Step 1). Inward movement of the pusher lever and tone arm is limited by the engagement of the contact roller 417 on the pusher lever with the periphery of the record on the turntable. This positions the tone arm for engagement of the needle N in the outer end of the playing groove in the record when the tone arm subsequently is lowered.

Step 13

At 206°, the valve 521 closes under the action of the cam 511. This opens port 551 to atmosphere. Vacuum motors 345 and 435 are thereupon vented through lines 361 and 449, Y-coupling 765, line 763, ports 723 and 717 of valve 665, line 761 and port 551. When motor 345 vents, the spring 337 rocks the tone arm lifting lever 327 to lower the tone arm 23, thereby entering the needle N in the outer end of the playing groove in the record, and starting the playing of the record. As the lever 327 is rocked by the spring 337, it pulls the piston 355 of motor 345 upward. When the motor 435 is vented the torsion spring 427 rocks the tone arm return lever 421 to its retracted position of Fig. 17, thereby permitting the tone arm to swing freely across the record by reason of the tracking action of the needle N in the playing groove of the record. As the lever 421 rocks to retracted position, it pulls the piston 445 of motor 435 outward toward the open end of the motor cylinder 437. Shortly after the valve 521 closes at 206°, the cam-operated switch 579 opens. This breaks the holding circuit through the relay coil 839, and the relay switch 837 opens. This deenergizes the cam shaft motor 571 and the vacuum pump motor 465. The main switch 267 remains closed so that the turntable motor 173 remains energized to drive the turntable. The cam shaft motor 571 coasts to a stop upon being deenergized and rotates the cam shaft 507 to a position a few degrees past the position wherein switch 579 opened.

Step 14

At 208°, the valve 524 closes under the control of the cam 514. This opens the transfer port 554 to atmosphere. This vents the cylinder 395 of the tone arm pusher lever motor 393 through the cylinder port 401, line 409, ports 725 and 715 of valve 665, line 767 and port 554. With the cylinder 395 vented, the spring 383 pulls the tone arm pusher lever 365 outward to retracted position.

The cam shaft 507 remains stopped between its 208° and 226° positions while the first side of the record on the turntable (which is now upright) is being played. As the record is played, the tone arm 23 is swung inward toward the center of the record by the tracking action of the needle in the playing groove in the record. As the tone arm swings inward, pins 423 and 455 swing clockwise with the tone arm (as viewed from above). When the needle enters the terminating spiral portion of the playing groove and the tone arm is thereby given its final inward swing, the pin 455 closes the tone-arm controlled switch 451.

When the switch 451 closes at the termination of the playing of the first side of the record, the relay coil 839 is energized through a circuit completed from terminal 813 of main switch 627 through wire 857, wire 853, switch 451, wire 851, wire 843, and the coil 839 to relay terminal 807. This closes the relay switch 837 and completes the previously described circuit from terminal 803 of switch 627 through wire 817, terminal 819, wire 821, terminal 823, cam shaft motor 571, terminal 831, wire 833 and switch 837 to terminal 807 to energize the motor 571. The vacuum pump motor 465 is also energized through wires 825 and 829 and drives the vacuum pump 463.

With the cam shaft motor 571 energized, rotation of the cam shaft is resumed, and the following steps occur:

Step 15

At 226°, cam 511 opens the valve 521 and closes the cam-operated switch 579. With valve 521 open, vacuums are drawn in the cylinders 347 and 437 of vacuum motors 345 and 435, as previously described in Step 1. Piston 335 of motor 345 is thereupon drawn downward to raise the tone arm and piston 445 of motor 435 is retracted to swing the tone arm outward to its retracted position. With switch 579 closed, the previously described holding circuit from terminal 803 through wire 817, switch 579, wires 847 and 843 and relay coil 839 to terminal 807 is re-established. This keeps the cam shaft motor 571 and the vacuum pump motor 465 operating even though the tone arm switch 451 opens when the tone arm swings outward to retracted position.

Step 16

At 252°, valve 526 moves to its intermediate position under the control of cam 516. This blocks port 556 from port 546. The cylinder 99 of vacuum motor 87 is already vented through port 566 as previously described in Step 5.

Step 17

At 254°, valve 526 moves to its inner position wherein transfer port 556 is open to atmosphere and port 546 is in communication through the valve with the port 566. This draws a vacuum in the cylinder 99 of vacuum motor 87 through the cylinder port 105, line 113, port 566, the valve, port 546, manifold 535 and suction line 537. Cylinder 89 of vacuum motor 85 is vented through the cylinder port 95, line 111 and port 556, the latter being open to atmosphere. With cylinder 89 vented and a vacuum in cylinder 99, the piston 103 in cylinder 99 moves downward. This rotates the turntable cradle 11 upward to swing the turntable 17 to its inverted position facing downward. The record remains gripped to the turntable by reason of the vacuum being drawn in the turntable suction pad 55 through line 83, port 557, valve 527, port 547 and line 759, the cam 517 holding the valve 527 in open position.

Step 18

At 317°, the cam 514 opens the valve 524. This draws a vacuum in the cylinder 395 of the tone arm pusher lever vacuum motor 393 and swings the pusher lever inward to position the tone arm for engagement of the needle in the outer end of the playing groove, as previously described in Step 12. The tone arm is raised at this time, cam 511 having previously opened valve 521 at 226° (Step 15).

Step 19

At 348°, valve 521 closes under the action of cam 511. This lowers the tone arm 23 to enter the needle in the outer end of the playing groove in the second side of the record and starting the playing of the second side, in the same manner as described in the description of the playing of the first side of the record. The tone arm return lever 421 is also rocked back to its retracted position by the spring 427.

Shortly after the valve 521 closes at 348°, the cam-operated switch 579 opens. This breaks the holding circuit through the relay coil 839, and the relay switch 837 opens. This deenergizes the cam shaft motor 571 and the vacuum pump motor 465. The main switch 627 remains closed and the turntable motor 173 remains energized to drive the turntable. The cam shaft motor 571 coasts to a stop upon being deenergized and rotates the cam shaft 507 to its 360° or 0° position.

Step 20

At 350°, valve 524 closes under control of cam 514. This results in the tone arm pusher lever 365 being swung outward to retracted position by spring 383, as previously described in Step 14.

The cam shaft 507 remains stopped in 0° position while the second side of the record on the turntable (which is now inverted) is being played. While the vacuum pump motor 465 is deenergized, and the vacuum pump 463 is out of operation during the playing interval for the second side, vacuum is maintained in the turntable suction pad 55 by reason of its connection to the vacuum reservoir 751 through line 83, port 557, valve 527 (which is open when cam 517 is in 0° position), port 547, line 759 and line 753. The reservoir holds sufficient vacuum to keep the record gripped to the inverted turntable for an interval sufficient to accommodate the playing of the second side of the longest playing record which the record player is to accommodate.

As the second side is played, the tone arm 23 is swung inward toward the center of the record by the tracking action of the needle in the playing groove. At the termination of playing the second side, the pin 455 closes the tone-arm controlled switch 451. This energizes the relay coil 839 and closes the relay switch 837 as previously described, whereupon cam shaft motor 571 is started and another record changing cycle is instituted.

Operation as above described continues, records from the supply stack being played in sequence on both sides either until the last record in the stack has been played or the record player is stopped by pushing the "Off" button 605. At the termination of playing the second side of the last record (the turntable 17 being inverted) the tone arm closes the switch 451, and starts the cam shaft motor 571 and the pump motor 465. The record player then operates through Steps 1–14 as above described, with the exception, of course, that no record is transferred to the turntable and played since there is no record to transfer. Thus, the record transfer arm simply idles through the action described in Step 8. When the tone arm is swung toward the turntable by the tone arm pusher lever (Step 12), since there is no record on the turntable for the contact roller 417 on the pusher lever to engage, the pusher lever swings inward to the limit of its swing as determined by the engagement of the roller 379 with the flywheel 141. The tone arm accordingly is swung inward to a corresponding position and then, at Step 13, is lowered, even though there is no record for the needle N to engage.

Thus, after the last record has been played, the cam shaft 507 remains stopped between its 208° and 226° positions. The turntable remains upright. The tone arm remains in the angular position mentioned in the preceding paragraph and is lowered. The record transfer arm remains in neutral position. A short time after the occurrence of Step 14, the bellows 647 functions to open the main switch 627 to stop the turntable motor 173. This action occurs because cam 517 holds the valve 527 in open position wherein ports 547 and 557 are in communication, and there is no record on the turntable. Under these circumstances, the bellows 647 is vented through line 657, line 753, line 759, port 547, port 557, line 83 and the turntable suction pad 55, which is open to atmosphere since there is no record on it. When the bellows is vented, it expands and opens the switch 627. The reservoir 751 is also vented at the same time the bellows is vented.

When another stack of records is placed on the record supply platform 5, and the "On" and "Reject" button 603 is pressed, the switches 615 and 627 are closed. With these switches closed, the relay coil 839 is energized through the circuit completed from terminal 813 of switch 627 through wire 857, switch 615, wire 843 and coil 839 to the relay terminal 807. This closes the relay switch 837 and completes the circuits for the cam shaft motor 571 and the vacuum pump motor 465. With the cam shaft motor 571 energized to drive the cam shaft 507, and with the motor 465 energized to drive the pump 463, the record player operates first through Steps 15–20, as above described. Since there is no record on the turntable, when the pusher lever swings inward at Step 18, it swings the tone arm inward far enough to close the switch 451, thus instituting operation. It will be noted that when the turntable is inverted with no record thereon, the flywheel 141 is located in such position that the roller 379 does not engage it when the pusher lever swings inward. This prevents stopping of the record changer with the turntable in inverted position. Then, the record changer operates through Steps 1–14 to swing the turntable to upright position, transfer a record thereto, and play the first side of the record.

If it is desired to stop the record player while a record is being played (either when the turntable is upright or inverted), the "Off" button 605 is pushed. This opens the main switch 627, thereby deenergizing the turntable driving motor 173 and stopping the turntable, with the needle N still tracking in the record groove. To resume the playing of the record from the point where it was discontinued, the "On" button 603 is pressed to close the main switch 627 to resume rotation of the turntable, but released quickly so that cam 511 is not rotated sufficiently to close the cam-operated relay holding switch 579. If the "Off" button should be pushed during the changing of records, the turntable will stop rotating, but the switch 579 will remain closed to energize the cam shaft motor 571 and the pump motor 465 until the cam shaft 507 has rotated to the next point where cam 511 opens switch 579. That is, if the "Off" button is pushed when the cam shaft 507 and cam 511 are at some point between their 0° and 206° positions, the cam shaft 507 will continue to rotate until cam 511 opens the switch 579 shortly after 206° and the cam shaft coasts to a stop between its 208° and 226° positions. If the "Off" button is pushed when the cam shaft 507 and cam 511 are at some point between 226° and 0°, the cam shaft 507 will continue to rotate until cam 511 opens the switch 579 shortly after 348° and the cam shaft coasts to a stop at 0°. The result is that even though the "Off" button should be pushed while the record player is operating either through the first phase sequence (Steps 1–14) or the second phase sequence (Steps 15–20) of the record changing cycle, the particular sequence of steps will be completed though the turntable is stopped.

To reject a record being played, the "On" and "Reject" button 603 is pushed and held down long enough to allow the cam shaft 507 and cam 511 to rotate sufficiently to close the relay holding switch 579. With this switch closed, the cam shaft motor 571 and pump motor 465 remain energized, even though the button is released.

Assuming that the turntable was upright and the first side of a record thereon being played, the record player will operate through Steps 15–20 to invert the turntable and play the other side of the record. Assuming that the turntable was already inverted and the second side of a record thereon being played, the record player will operate through Steps 1–14, discard the record being played, transfer the next record from the supply stack to the turntable, and play its first side.

To set the record player to play single sides, the selector knob 609 is turned to the position where the pointer 743 on the knob points to the "Single" indication 745. This sets the selector valve disc 735 for communication from port 731 to port 733 through ports 737, passage 739 and port 738. Under these circumstances, when a vacuum is drawn in line 769 connected to port 731, a vacuum is drawn in bellows 679 through line 697, port 733, port 738, passage 739 and port 737. This collapses the bellows, moving the rod 687 to the right as viewed in Fig. 34 to rotate the valve disc 669 to its single side playing position wherein ports 723 and 719 are aligned and ports 725 and 721 are aligned, and thereby closing switch 699.

Assuming that the turntable 17 is upright and the first side of a record thereon is being played, the cam shaft 507 will be stopped in its intermediate position between 208° and 226°. With the cam shaft in this position, the valve 526 is held in its outer position by the cam 516, wherein port 566 is open to atmosphere. The bellows 679 is thus vented through line 697, port 733, port 738, passage 739, port 737, port 731, line 769, line 113 and open port 566, and is expanded so that the valve disc 669 is in its Fig. 35 position and switch 699 is open. At the termination of the playing of the record, the tone arm 23 closes switch 451. This institutes rotation of the cam shaft 507 and operation of the vacuum pump 463. As the cam shaft rotates, the record changing Steps 15, 16 and 17 occur as when double sides are played. At Step 17 the valve 526 is moved to its inner position wherein port 546 is in communication with port 566 and a vacuum is drawn in line 113 to invert the turntable. This draws a vacuum in the bellows 679, and the latter collapses. This rotates the valve disc 669 to its single side playing position wherein switch 699 is closed.

With the switch 699 closed, a holding circuit for the relay is completed from terminal 813 of main switch 627 (this switch being closed) through wire 857, wire 859, switch 699, wire 861, terminal 845, wire 843, and coil 839 to relay terminal 807. This holds relay switch 837 closed and keeps the cam shaft motor 571 and the pump motor 465 running. With the valve disc 669 in its single side playing position, port 723 is in communication with port 719 and port 725 is in communication with vent 721. Ports 715 and 717 are blocked. Under these circumstances, Steps 18, 19 and 20 are omitted. Step 18 is omitted because the line 409 for the cylinder 395 of the tone arm pusher lever vacuum motor is blocked at port 725. Step 19 is omitted because a vacuum is drawn in the tone arm lifting motor 345 through line 361, line 763, port 723, port 719, line 771 and line 697. This holds the tone arm raised. Step 30 is omitted since the tone arm pusher lever 365 was not previously swung inward.

The cam shaft 507 continues to rotate past its 0° position and record changing Steps 1–14 occur in sequence so that another record is transferred to the turntable and its first side played. The valve 526 remains in its inner position until the occurrence of Step 4, whereupon the valve moves to open the port 566 to atmosphere. The bellows 679 is thereupon vented through line 697, ports 733 and 731, line 769, line 113 and port 566. Consequently, it expands, thereby rotating the valve disc 669 back to its Fig. 35 position and opening the switch 669.

From the above description, it will be seen that while the record player of this invention embodies certain essential basic features of the record player disclosed in the aforesaid application Serial No. 629,932, now Patent No. 2,601,301, such as the basic feature of inverting the turntable to play the second side of a record, holding the record on the turntable by suction, and releasing the record to drop to the record receiver when the playing of the second side is completed, it embodies specific improvements which simplify its construction, improve its operation, and make it possible to provide a double side record player of relatively small dimensions suitable for convenient installation where space is limited. Its compactness results from the pivoting of the record transfer arm on a horizontal axis and the pivoting of turntable cradle on an axis which is diagonal with respect to the pivotal axis of the record transfer arm. As actually constructed to accommodate conventional ten and twelve inch records, the record player is only twenty-six inches long and thirteen and one-half inches wide. The table stands only seven and one-half inches high, and only seven and one-half inches is required above the table to accommodate the record transfer arm. These dimensions are such that the record player may be readily installed or located in a limited space. It will be noted that the pump and cam shaft motors are energized and the pump and cam shaft are driven only when records are being changed and are out of operation while a record is being played. The only motor in operation during the playing of a record is the turntable motor. This eliminates extraneous noise during the playing of a record, and provides for undisturbed listening pleasure. It will also be noted that only a single cam shaft is employed to control the record changing operations, this shaft rotating through part of a revolution to accomplish inversion of the turntable and the playing of the second side of a record, and through the remainder of the revolution to drop the played record, return the turntable to upright position, transfer a record to the turntable and play its first side. This is a considerable simplification, along with the specific turntable drive and the specific mechanism for lifting the tone arm.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A record changer comprising a frame, a turntable mounted on the frame for pivotal movement about a horizontal axis between an upright position wherein it faces upward and an inverted position wherein it faces downward, a platform on the frame located adjacent the turntable for holding a stack of records to be played, a record transfer arm pivoted on the frame for swinging movement about a horizontal axis extending between the turntable and platform, and a record lifter pivoted on a horizontal axis on the record transfer arm, the latter being swingable on its pivotal axis between a position extending over the platform to engage the record lifter flatwise with the uppermost record of the stack and a position extending over the upright turntable to deposit a record flatwise thereon, the pivotal axis of the turntable extending diagonally with respect to the pivotal axis of the transfer arm.

2. A record changer comprising a frame, a turntable supported by the frame, a platform on the frame located adjacent the turntable for holding a stack of records to be played, a record transfer arm pivoted on the frame for swinging movement about a horizontal axis extending between the turntable and platform, said transfer arm being of inverted U-shape and pivoted on the frame at the lower ends of its sides, and a record lifter loosely pivoted on a horizontal axis centrally on the upper bar of the transfer arm to hang downward therefrom, said transfer arm being swingable on its pivotal axis between a position extending over the platform to engage the record lifter flatwise with the uppermost record of the stack and a position extending over the turntable to transfer the uppermost record from the stack flatwise to the turntable without inverting it, said transfer arm being sufficiently wide between the sides of the U for passage of the record between the sides of the U as it swings from the stack to the turntable.

3. A record changer comprising a frame, a turntable supported by the frame, a platform on the frame located adjacent the turntable for holding a stack of records to be played, a record transfer arm pivoted on the frame for swinging movement about a horizontal axis extending between the turntable and platform, a record lifter pivoted on a horizontal axis on the record transfer arm, the latter being swingable on its pivotal axis between a position extending over the platform to engage the record lifter with the central portion of the uppermost record of the stack and a position extending over the turntable to transfer the uppermost record from the stack to the turntable without inverting it, and a record centering pin extending upward from the platform and curved on an arc having its center substantially in the pivotal axis of the transfer arm and its radius substantially equal to the radius of the record lifter, the latter being apertured to receive the record centering pin when the transfer arm is swung over the platform to engage the record lifter with the uppermost record of the stack.

4. A record changer comprising a frame, a turntable mounted on the frame for pivotal movement about a horizontal axis between an upright position wherein it faces upward and an inverted position wherein it faces downward, a platform on the frame located adjacent the turntable for holding a stack of records to be played, a record transfer arm pivoted on the frame for swinging movement about a horizontal axis extending between the turntable and platform, a record lifter pivoted on a horizontal axis on the record transfer arm, the latter being swingable on its pivotal axis between a position extending over the platform to engage the record lifter flatwise with the central portion of the uppermost record of the stack and a position extending over the upright turntable to deposit a record flatwise thereon, and a record centering pin extending upward from the platform and curved on the arc described by the record lifter, the latter having an aperture receiving the record centering pin when the transfer arm is swung over the platform to engage the record lifter with the uppermost record of the stack, the pivotal axis of the turntable extending diagonally with respect to the pivotal axis of the transfer arm.

5. A record changer comprising a table, a record transfer arm pivoted on the table for swinging movement about a horizontal axis, a record lifter on said arm for centrally engaging and lifting a record, said table having an aperture to one side of said axis larger than the largest record to be played, and adapted to support a stack of records on the other side of said axis, a pin extending upward from the table for centering the records in the stack, a turntable cradle spanning said aperture and pivotally mounted on the table for swinging movement about a horizontal axis extending diagonally across the aperture in respect to the transfer arm axis, and a turntable carried by the cradle to swing therewith between upright and inverted positions, said turntable having a record centering pin which is located, when the turntable is upright, at a distance from the transfer arm axis equal to the distance from the transfer arm axis to the stack centering pin, the transfer arm being swingable on its pivotal axis between a position extending over the platform to engage the uppermost record of the stack and a position extending over the upright turntable to transfer the uppermost record from the stack to the turntable.

6. A record changer comprising a table, a record transfer arm pivoted on the table for swinging movement about a horizontal axis, a vacuum grip record lifter pivoted on said arm for centrally engaging and lifting a record, said table having an aperture to one side of said axis larger than the largest record to be played, and adapted to support a stack of records on the other side of said axis, a pin extending upward from the table for centering the records in the stack, a turntable cradle spanning said aperture and pivotally mounted on the table for swinging movement about a horizontal axis extending diagonally across the aperture in respect to the transfer arm axis, and a turntable carried by the cradle to swing therewith between upright and inverted positions, said turntable having a record centering pin which is located on the same radius from the transfer arm axis as the stack centering pin when the turntable is upright, the transfer arm being swingable on its pivotal axis between a position extending over the platform to engage the record lifter with the uppermost record of the stack and a position extending over the upright turntable to transfer the uppermost record from the stack to the turntable without inverting it, the record lifter having an aperture receiving the centering pins, the stack centering pin being curved on the arc described by the record lifter.

7. A record changer comprising a table, a record transfer arm of inverted U-shape pivoted on the table for swinging movement about a horizontal axis at the lower ends of its sides, a ring-shaped vacuum-grip record lifter pivoted centrally on the upper bar of said arm for centrally engaging and lifting a record, said table having an aperture to one side of said axis larger than the largest record to be played and adapted to support a stack of records on the other side of said axis, a pin extending upward from the table for centering the records in the stack, a turntable cradle spanning said aperture and pivotally mounted on the table for swinging movement about a horizontal axis extending diagonally across the aperture in respect to the transfer arm axis, and a turntable carried by the cradle to swing therewith between upright and inverted positions, said turntable having a record centering pin which is located on the same radius from the transfer arm axis as the stack centering pin when the turntable is upright, said transfer arm being swingable on its pivotal axis between a position wherein the record lifter is centered on the stack centering pin and engaging the uppermost record of the stack, and a position wherein the record lifter is centered on the record centering pin on the upright turntable, the stack centering pin being curved on the arc described by the record lifter.

8. In an automatic record player, record transfer mechanism comprising an arm of inverted U-shape pivoted for swinging movement about a horizontal axis at the lower ends of its sides, and a vacuum-grip record lifter loosely pivoted on a horizontal axis centrally on the upper bar of the arm.

9. In an automatic record player, record transfer mechanism comprising an arm of inverted U-shape pivoted for swinging movement about a horizontal axis at the lower ends of its sides, and a vacuum-grip record lifter comprising a ring having an annular suction pad surrounding the central opening in the ring, said pad having inner and outer flexible lips defining a channel, said ring being loosely pivoted on a horizontal axis centrally on the upper bar of the arm with the channel opening downward.

10. In an automatic record player as set forth in claim 9, mechanism for swinging the arm comprising a pair of vacuum motors coupled to the arm.

11. In an automatic record player as set forth in claim 9, mechanism for swinging the arm comprising a pair of vacuum motors each consisting of a cylinder and a piston slidable in the cylinder, the piston of one of said motors being coupled to the arm to swing it in one direction when the cylinder of said one motor is evacuated, the piston of the other motor being coupled to the arm for swinging it in the opposite direction when the cylinder of the said other motor is evacuated.

12. In an automatic record player as set forth in claim 9, mechanism for swinging the arm comprising a pair of vacuum motors each consisting of a cylinder and a piston slidable in the cylinder, the piston of one of said motors being coupled to the arm to swing it in one direction when the cylinder of said one motor is evacuated, the piston of the other motor being coupled to the arm for swinging it in the opposite direction when the cylinder of the said other motor is evacuated, and spring counterbalancing mechanism coupled to the arm for normally maintaining it in a generally upright position when said motors are out of operation.

13. An automatic double side record player comprising a vacuum-grip turntable mounted for swinging movement between an upright position facing upward and an inverted position facing downward, said turntable being of such outline as to engage a record only at its ungrooved central portion to expose the playing grooves of both sides of the record, a tone arm associated with the turntable for playing the upper side of a record thereon; said turntable being connected in a vacuum system including a vacuum reservoir, a vacuum pump connected to draw a vacuum in said reservoir, a motor for driving the pump, and a control associated with the motor and tone arm operable in response to the tone arm reaching the end of the playing groove of the upper side of a record on the upright turntable to start the motor, and to stop the motor upon the instigation of the playing of the other side of the record after the turntable is inverted, the record being gripped to the inverted turntable while being played by vacuum drawn in the turntable from the reservoir.

14. An automatic double side record player comprising an invertible vacuum-grip turntable for gripping a record by its central ungrooved portion, vacuum-operated mechanism associated with the turntable for swinging it between upright and inverted positions, a record transfer arm having a vacuum-grip record lifter movable to pick up a record from a supply stack adjacent the turntable and to place the record on the turntable when the latter is upright, vacuum-operated mechanism associated with the transfer arm for moving it, a tone arm associated with the turntable for playing a record thereon, vacuum-operated mechanism associated with the tone arm for moving the tone arm from a retracted position to playing position and back to retracted position, said vacuum-grip turntable, vacuum-grip record lifter and all of said vacuum-operated mechanisms being connected in a vacuum system including a set of valves, a cam shaft associated with said set of valves and having cams thereon for operating said valves in record-changing sequence, an electric motor coupled to said cam shaft, means associated with said tone arm for energizing said motor in response to the tone arm reaching the end of the playing groove of the uppermost side of a record on the turntable when the latter is inverted to drive said cam shaft through a fraction of a revolution during which the valves are operated by the cams in a first phase sequence to retract the tone arm, vent the turntable to drop the record therefrom, swing the turntable to upright position, move the transfer arm to pick up a record from the supply stack and place it on the upright turntable, evacuate the turntable to grip the record, and move the tone arm to record-playing position thereby to play the uppermost side of the new record on the upright turntable, said means being operable in response to the tone arm reaching the end of the playing groove of said side to energize the motor to drive the cam shaft through the remainder of the revolution during which the valves are operated in a second phase sequence to retract the tone arm, invert the turntable, and return the tone arm to play the uppermost side of the record on the inverted turntable.

15. An automatic double side record player as set forth in claim 14, further comprising a vacuum pump connected in the vacuum system for evacuating it, an electric motor coupled to the pump and connected to be energized whenever the cam shaft motor is energized, and a reservoir in the vacuum system for holding a vacuum in the turntable so that the turntable will grip a record during the playing of a record when the motors and the vacuum pump are out of operation.

16. An automatic double side record player as set forth in claim 14, further comprising a manual control associated with the vacuum system for selectively setting the record player to play double sides as described or to play single sides only, said control, when set to play single sides, causing the omission of the return of the tone arm during the second phase sequence and holding the cam shaft motor energized at the termination of said sequence to cause the cam shaft to continue to rotate through the first phase sequence.

17. A record changer comprising a frame, a turntable supported by the frame, a platform on the frame located adjacent the turntable for holding a stack of records to be played, a record transfer arm pivoted on the frame for swinging movement about a horizontal axis extending between the turntable and the platform, said transfer arm having a portion extending generally radially from its pivotal axis clear of the path from the platform to the turntable, and an upper portion swingable with the generally radial portion between a position over the platform and a position over the turntable, a record lifter pivoted on a horizontal axis on said upper portion of the transfer arm and located for engagement with the central portion of the uppermost side of the uppermost record of the stack when the arm is swung to the position over the platform, said lifter being adapted to lift the engaged record as the arm swings toward the turntable and to pivot relative to the arm to maintain the record with its said uppermost side facing upward as the upper portion of the arm swings into position over the turntable to deposit the record thereon without inverting it.

References Cited in the file of this patent

UNITED STATES PATENTS

| | | |
|---|---|---|
| 1,289,584 | Weser | Dec. 31, 1918 |
| 1,542,259 | Macy | June 16, 1925 |
| 1,883,527 | Bryant | Oct. 18, 1932 |
| 1,918,588 | Bryant | July 18, 1933 |
| 1,955,534 | Collison | Apr. 17, 1934 |
| 2,068,449 | Downs | Jan. 19, 1937 |
| 2,080,924 | Logan et al. | May 18, 1937 |
| 2,083,037 | Schmittgen | June 8, 1937 |
| 2,307,030 | Erwood | Jan. 5, 1943 |
| 2,307,926 | Griffith et al. | Jan. 12, 1943 |
| 2,342,411 | Lissiansky | Feb. 22, 1944 |
| 2,353,763 | Rodman | July 18, 1944 |
| 2,356,137 | Weaver | Aug. 22, 1944 |
| 2,370,875 | Pressley | Mar. 6, 1945 |
| 2,386,166 | Lissiansky | Oct. 2, 1945 |
| 2,418,701 | Davis | Apr. 8, 1947 |
| 2,501,391 | Karp | Mar. 21, 1950 |

FOREIGN PATENTS

| | | |
|---|---|---|
| 710,187 | France | Aug. 19, 1931 |
| 556,907 | Germany | July 28, 1932 |